US009565800B2

(12) United States Patent
Fay, II et al.

(10) Patent No.: US 9,565,800 B2
(45) Date of Patent: Feb. 14, 2017

(54) WINDROW SHIELD CONTROL SYSTEM FOR A HEADER OF AN AGRICULTURAL HARVESTER

(71) Applicant: CNH Industrial America LLC, New Holland, PA (US)

(72) Inventors: Jeffrey B. Fay, II, Lititz, PA (US); Nakul Vilas Deshpande, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 11 days.

(21) Appl. No.: 14/479,571

(22) Filed: Sep. 8, 2014

(65) Prior Publication Data
US 2016/0066509 A1    Mar. 10, 2016

(51) Int. Cl.
*A01D 43/06*    (2006.01)
*A01D 57/28*    (2006.01)

(52) U.S. Cl.
CPC ............... *A01D 43/06* (2013.01); *A01D 57/28* (2013.01)

(58) Field of Classification Search
CPC .... A01D 43/06; A01D 43/073; A01D 43/087; A01D 75/00; A01D 82/00; A01D 82/02; A01D 34/667; A01F 29/01
See application file for complete search history.

(56) References Cited

U.S. PATENT DOCUMENTS 1,421,439 A * 7/1922 Finckh ..................... B61D 7/26
                                                     105/250

2,109,098 A    2/1938 Baxter
(Continued)

FOREIGN PATENT DOCUMENTS

DE    4309498    9/1994
DE    20113820   12/2001
(Continued)

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 45 pages.
(Continued)

*Primary Examiner* — Robert Pezzuto
*Assistant Examiner* — Adam Behrens
(74) *Attorney, Agent, or Firm* — Peter K. Zacharias; Patrick M. Sheldrake

(57) ABSTRACT

An agricultural harvester is provided which includes a chassis and harvesting wheels, transport wheels and windrow shields connected to the chassis. The transport wheels are deployed in concert with the windrow shields in order to avoid damage to the windrow shields during placement of the transport wheels into an operative, ground contacting position. A first actuator opens and closes the windrow shields for field and transport operations and windrow shield positioning mechanisms are configured to dispose the windrow shields in a plurality of cut crop opening widths when the windrow shields are in an open position. The first actuator is operated remotely in-cab to eliminate need for the harvester operator to dismount the harvester and open and close the windrow shields for field and road transport operations. The windrow shield positioning mechanisms may be manually adjusted or automatically adjusted in-cab.

13 Claims, 17 Drawing Sheets

(56) References Cited

U.S. PATENT DOCUMENTS

| | | | |
|---|---|---|---|
| 2,286,305 A | 6/1942 | Priestley | |
| 2,540,228 A | 2/1951 | Adkisson | |
| 2,833,105 A | 5/1958 | Naery | |
| 2,911,780 A * | 11/1959 | Brady | A01D 43/10 56/1 |
| 2,938,588 A | 5/1960 | Stein | |
| 3,241,300 A * | 3/1966 | Fell | A01D 82/00 56/1 |
| 3,245,695 A | 4/1966 | Bernard | |
| 3,288,480 A | 11/1966 | Calkins et al. | |
| 3,408,956 A * | 11/1968 | Georgievich | B61D 7/28 105/240 |
| 3,515,408 A | 6/1970 | Cagle | |
| 3,523,410 A * | 8/1970 | Taylor | A01D 43/105 280/473 |
| 3,577,713 A | 5/1971 | McCarty et al. | |
| 3,590,928 A | 7/1971 | Mirus | |
| 3,648,780 A | 3/1972 | Fueslein et al. | |
| 3,683,602 A * | 8/1972 | Scarnato | A01D 43/107 56/14.4 |
| 3,721,073 A * | 3/1973 | Scarnato | A01D 43/10 56/16.4 B |
| 3,786,764 A * | 1/1974 | Beers, Jr. | B61D 7/28 105/240 |
| 3,814,191 A | 6/1974 | Tilbury | |
| 3,841,070 A * | 10/1974 | Scarnato | A01D 84/00 56/14.4 |
| 3,881,301 A * | 5/1975 | Sawyer | A01D 57/28 56/14.4 |
| 3,897,832 A | 8/1975 | Leedahl et al. | |
| 3,911,649 A * | 10/1975 | Scarnato | A01D 57/28 56/1 |
| 3,919,831 A | 11/1975 | Halls et al. | |
| 3,955,627 A | 5/1976 | Brown | |
| 4,026,365 A | 5/1977 | Andersson et al. | |
| 4,043,403 A | 8/1977 | Anderson et al. | |
| 4,099,364 A * | 7/1978 | Kanengieter | A01D 57/28 56/16.4 C |
| 4,106,788 A | 8/1978 | Bohnert | |
| 4,106,813 A * | 8/1978 | Goodbary | B60P 1/56 105/240 |
| 4,119,329 A | 10/1978 | Smith | |
| 4,162,085 A | 7/1979 | Miranowski | |
| 4,180,135 A | 12/1979 | Birkenbach et al. | |
| 4,222,334 A * | 9/1980 | Peterson | B61D 7/24 105/250 |
| 4,283,071 A | 8/1981 | Pedersen | |
| 4,316,511 A | 2/1982 | Andersen | |
| 4,361,341 A | 11/1982 | Gustafson | |
| 4,418,516 A | 12/1983 | Donovan et al. | |
| 4,418,517 A | 12/1983 | Ehrhart et al. | |
| 4,418,518 A | 12/1983 | Koch et al. | |
| 4,435,948 A | 3/1984 | Jennings | |
| 4,442,662 A | 4/1984 | Jennings | |
| 4,455,034 A | 6/1984 | de Graff et al. | |
| 4,460,193 A | 7/1984 | Dietz et al. | |
| 4,506,904 A | 3/1985 | Kinzenbaw | |
| 4,512,416 A | 4/1985 | Smith | |
| 4,526,235 A | 7/1985 | Kinzenbaw | |
| 4,534,416 A | 8/1985 | Johnson | |
| 4,552,375 A | 11/1985 | Kinzenbaw | |
| 4,558,560 A | 12/1985 | Koch | |
| 4,573,309 A | 3/1986 | Patterson | |
| 4,607,996 A | 8/1986 | Koch | |
| 4,660,654 A | 4/1987 | Wiebe et al. | |
| 4,662,646 A | 5/1987 | Schlapman et al. | |
| 4,682,462 A | 7/1987 | Johnson, Sr. | |
| 4,765,639 A | 8/1988 | Murray | |
| 4,831,814 A | 5/1989 | Frisk et al. | |
| 4,867,245 A | 9/1989 | Stevens | |
| 4,871,028 A | 10/1989 | Murray | |
| 4,905,466 A | 3/1990 | Heppner | |
| 4,934,131 A | 6/1990 | Frisk et al. | |
| 4,986,064 A | 1/1991 | Ermacora | |
| 4,991,383 A | 2/1991 | Ermarcora | |
| 5,000,268 A | 3/1991 | Zimmerman | |
| 5,024,279 A | 6/1991 | Warner et al. | |
| 5,025,616 A | 6/1991 | Moss | |
| 5,113,956 A | 5/1992 | Friesen et al. | |
| 5,136,828 A | 8/1992 | Ermacora | |
| 5,199,250 A | 4/1993 | Ermacora | |
| 5,243,810 A | 9/1993 | Fox et al. | |
| 5,274,990 A | 1/1994 | Aron et al. | |
| 5,429,195 A | 7/1995 | Turnis | |
| 5,566,536 A | 10/1996 | Krafka et al. | |
| 5,642,607 A | 7/1997 | Stephenson et al. | |
| 5,778,647 A * | 7/1998 | McLean | A01D 34/664 56/13.6 |
| 5,839,516 A | 11/1998 | Arnold et al. | |
| 5,901,533 A | 5/1999 | Ermacora et al. | |
| 5,930,988 A * | 8/1999 | Hanson | A01D 57/00 56/16.4 A |
| 5,943,848 A * | 8/1999 | Rice | A01D 34/664 56/16.4 B |
| 6,152,240 A | 11/2000 | Nonhoff et al. | |
| 6,189,306 B1 | 2/2001 | Walch | |
| 6,209,297 B1 | 4/2001 | Yeomans et al. | |
| 6,213,219 B1 | 4/2001 | Mosdal et al. | |
| 6,238,170 B1 | 5/2001 | Pingry et al. | |
| 6,260,629 B1 | 7/2001 | Toth | |
| 6,273,449 B1 | 8/2001 | Harkcom et al. | |
| 6,321,852 B1 | 11/2001 | Pratt | |
| 6,336,313 B1 | 1/2002 | Bonnewitz | |
| 6,360,516 B1 | 3/2002 | Harkcom et al. | |
| 6,408,950 B1 | 6/2002 | Shoup | |
| 6,421,994 B1 | 7/2002 | Boucher et al. | |
| 6,485,246 B1 | 11/2002 | Harkcom et al. | |
| 6,546,708 B2 | 4/2003 | Faivre | |
| 6,606,956 B1 | 8/2003 | Paluch | |
| 6,702,035 B1 | 3/2004 | Friesen | |
| 6,739,612 B2 | 5/2004 | Colistro | |
| 6,854,251 B2 * | 2/2005 | Snider | A01D 82/00 56/192 |
| 6,907,719 B2 | 6/2005 | Ligouy | |
| 7,047,714 B1 | 5/2006 | Stephenson et al. | |
| 7,100,350 B2 | 9/2006 | Breneur | |
| 7,197,865 B1 | 4/2007 | Enns et al. | |
| 7,347,277 B2 | 3/2008 | Enns et al. | |
| 7,552,579 B2 | 6/2009 | Tippery et al. | |
| 7,712,544 B1 | 5/2010 | Misenhelder et al. | |
| 7,849,933 B2 | 12/2010 | Marggi | |
| 7,926,249 B1 | 4/2011 | Cook | |
| 8,112,977 B2 | 2/2012 | Priepke | |
| 8,141,652 B2 | 3/2012 | Poole et al. | |
| 8,209,946 B2 | 7/2012 | Neudorf et al. | |
| 8,292,328 B2 | 10/2012 | Honas et al. | |
| 8,464,508 B2 | 6/2013 | Matousek et al. | |
| 9,179,591 B2 | 11/2015 | Barnett et al. | |
| 9,179,592 B2 | 11/2015 | Snider et al. | |
| 9,185,837 B2 | 11/2015 | Barnett et al. | |
| 9,185,838 B2 | 11/2015 | Chan et al. | |
| 9,185,839 B2 | 11/2015 | Kolegaev et al. | |
| 2002/0005629 A1 | 1/2002 | Rosenboom | |
| 2004/0011538 A1 | 1/2004 | Raducha et al. | |
| 2006/0123764 A1* | 6/2006 | McLean | A01D 43/04 56/350 |
| 2011/0197561 A1 | 8/2011 | Priepke | |
| 2011/0272917 A1 | 11/2011 | Hilsabeck et al. | |
| 2012/0132768 A1 | 5/2012 | Lammerant et al. | |
| 2013/0284467 A1 | 10/2013 | Snider et al. | |
| 2013/0284468 A1 | 10/2013 | Barnett et al. | |
| 2013/0284469 A1 | 10/2013 | Barnett et al. | |
| 2014/0053522 A1 | 2/2014 | Kolegaev et al. | |
| 2014/0083071 A1* | 3/2014 | Fay, II | A01D 34/667 56/15.6 |
| 2014/0096498 A1* | 4/2014 | Estock | A01D 43/06 56/192 |
| 2014/0196429 A1* | 7/2014 | Gantzer | A01B 73/02 56/377 |

(56) References Cited

U.S. PATENT DOCUMENTS

2015/0282426 A1\* 10/2015 Gantzer ................ A01D 57/28
  56/376
2016/0007534 A1   1/2016 Fay, II

FOREIGN PATENT DOCUMENTS

| EP | 350513 | 1/1990 |
|---|---|---|
| EP | 628237 | 12/1994 |
| EP | 764396 | 3/1997 |
| EP | 818134 | 1/1998 |
| EP | 823985 | 2/1998 |
| EP | 1769668 | 4/2007 |
| FR | 2332690 | 6/1977 |
| FR | 2712137 | 5/1995 |
| FR | 2752356 | 2/1998 |
| GB | 2194872 | 3/1988 |
| GB | 2232055 A | 12/1990 |
| GB | 2490342 | 10/2012 |
| GB | 2504093 | 1/2014 |
| WO | WO2013135676 | 9/2013 |

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 16 pages.

EP Application No. 15184185, European Search Report, dated Jan. 27, 2016, 6 pages.

\* cited by examiner

WINDROW SHIELD CONTROL SYSTEM FOR A HEADER OF AN AGRICULTURAL HARVESTER

BACKGROUND

The subject application relates generally to a header for use with agricultural harvesters. In particular, the subject application relates to an improved windrow shield control system for use with pull-type or self-propelled mower headers.

Mower headers have been used to cut plants including, but not limited to, hay, grasses, small grains and the like for many years. Because of their particular cutting devices, such mower headers are often referred to as Disc Mower Conditioners (DMCs). A pull-type DMC is pulled by a tractor and can have a trailing tongue that pivots and is attached to the left side of the header trail frame or chassis (Side Pull DMC) or it can have a trailing tongue that pivots and attaches to the center of the header trail frame or chassis (Center Pivot DMC). Side pull DMC's can only pivot to the right of the tractor and center pivot DMC's can pivot to the left or right of the tractor. The cutting of the DMC, whether pull-type or self-propelled, is performed by a cutter device. The cutter device of a typical DMC is made up of multiple discs arranged in side-by-side relationship with each disc having a plurality of cutting knives. The discs spin at a certain RPM sufficient to cut the crop. Other mowing apparatuses may include sickle mowers or rotary mowers. Regardless of the type of mowing apparatus, the cutter device feeds the cut crop into a conditioner such as a roll conditioner or a flail conditioner. Which conditioner is used depends on the crop being cut. The rolls of a roll conditioner are typically either rubber, urethane or steel. After being conditioned the crop is propelled out of the back of the mower and onto the ground. Adjustable shielding in the back of the mower allows the operator to lay the cut crop in a swath such that it covers the ground like a carpet or mat or in a windrow whereby crop lays in a tall row. The manner in which crop is laid on the ground (mat or windrow) depends on whether the crop needs to be dried more and/or how it is to be picked up and packaged.

Whether pull-type or self-propelled, mower headers are normally equipped with spaced apart windrow shields that are pivotably connected at their proximal ends to the trail frame or chassis of the header. The windrow shields are panel-like members that are manually set to desired positions in order to adjust the width and lateral location of the crop windrow produced by the mower. The mower is often equipped with field or harvesting wheels which contact the ground surface during mowing/harvesting and transport wheels which contact the ground when the mower is to be transported over farm lanes, through gates or on roads where the machine width will not allow passage of the mower in the mowing orientation.

The ability to provide narrow road transport capabilities on a DMC or other mower apparatus requires that any parts of the machine extending beyond the typical 10-foot maximum width for transport mode must be collapsed or moved in for road transport. This includes the windrow shields. This can be accomplished by the operator exiting the tractor and closing the windrow shields before deploying the transport wheels. That is, when transitioning the mower from the field mode to the transport mode, the tractor operator must dismount the tractor and physically close the windrow shields in order to reduce the width of the mower header in transport. Not only is this task time consuming, the operator must remember to do so, especially in circumstances where a transport wheel frame might come into contact with the windrow shields when being disposed from its inoperative (raised) to operative (lowered) positions. As will be appreciated, the operator may not always remember to place the windrow shields into the closed position, which can result in damage to the open windrow shields by contact of the windrow shields with the transport wheel frame when the transport wheels are lowered into their ground-engaging operative position.

BRIEF SUMMARY

In accordance with a first aspect, the subject application provides a header for an agricultural harvester comprising a chassis and first and second spaced apart windrow shields each having proximal ends pivotably connected to the chassis and distal ends defining an opening width for passage of cut crop material. A windrow shield positioning mechanism is provided which includes a linkage assembly that couples the first and second windrow shields for movement between an open position and a closed position, and a windrow shield positioning adjuster configured to dispose the distal ends of the windrow shields in a plurality of cut crop material opening widths. The windrow shield positioning mechanism further includes a first actuator operatively connected to the linkage assembly and configured to move the windrow shields between open and closed positions independent of the cut crop material opening width.

In accordance with a second aspect, the subject application provides a header for an agricultural harvester including a chassis and harvesting wheels and transport wheels attached to the chassis. The transport wheels are positionable between an operative position wherein the transport wheels are in contact with a ground surface and the harvesting wheels are in a position spaced from the ground surface and an inoperative position wherein the transport wheels are in a position spaced from the ground surface and the harvesting wheels are in contact with the ground surface. A transport wheel actuator positions the transport wheels between the operative and inoperative positions. First and second spaced apart windrow shields are provided which have proximal ends pivotably connected to the chassis and distal ends defining an opening width for the passage of cut crop material. A windrow shield positioning mechanism is provided which includes a linkage assembly that couples the first and second windrow shields for movement between an open position and a closed position, and a windrow shield positioning adjuster configured to dispose the distal ends of the windrow shields into selected cut crop material opening widths. The windrow shield positioning mechanism further includes a first actuator operatively connected to the linkage assembly moves the windrow shields between the open and closed positions independent of the selected cut crop material opening width.

In accordance with a third aspect, the subject application provides a header for an agricultural harvester including a chassis and first and second spaced apart windrow shields having proximal ends pivotably connected to the chassis and distal ends defining an opening width for passage of cut crop material. A linkage assembly couples the first and second windrow shields for movement between an open position and a closed position, and a first actuator is operatively connected to the linkage assembly for moving the windrow shields between the open and closed positions independent of the cut crop material opening width. A second actuator operatively connected to the first windrow shield moves the first windrow shield to a desired open position independently of the second windrow shield and a third actuator operatively connected to the second windrow shield moves the second windrow shield to a desired open position independently of the first windrow shield.

In accordance with a fourth aspect, the subject application provides a header for an agricultural harvester including a chassis and first and second spaced apart windrow shields each having proximal ends pivotably connected to the chassis and distal ends defining an opening width for passage of cut crop material. A windrow shield positioning mechanism is provided which includes a linkage assembly that couples the first and second windrow shields for movement between an open position and a closed position. The linkage assembly comprises a central control arm having first and second ends, a first crank member pivotably connected to the chassis and the first end of the central control arm, a second crank member pivotably connected to the chassis and the second end of the central control arm, a first lateral control arm pivotably connected to the first crank member and the first windrow shield, and a second lateral control arm pivotably connected to the second crank member and the second windrow shield. A first actuator is operatively connected to the linkage assembly and configured to move the windrow shields between open and closed positions independent of the cut crop material opening width. The windrow shield positioning mechanism further includes a windrow shield positioning adjuster configured to dispose the distal ends of the windrow shields in a plurality of cut crop material opening widths. The windrow shield positioning adjuster comprises a plurality of spaced apart holes provided on an elongate portion of the first crank member for receiving a first end of the first lateral control arm and establishing a desired open position of the first windrow shield, and a plurality of spaced apart holes provided on an elongate portion of the second crank member for receiving a first end of the second lateral control arm and establishing a desired open position of the second windrow shield.

In accordance with a fifth aspect, the subject application provides a method for operating a header for an agricultural harvester wherein the header has a chassis and transport wheels and harvesting wheels attached to the chassis. The method comprises the acts of pivotably connecting proximal ends of spaced apart first and second windrow shields to the chassis and coupling the windrow shields with a linkage assembly for movement between an open position and a closed position. The method further includes the acts of providing a windrow shield positioning adjuster configured to dispose distal ends of the windrow shields into selected cut crop material opening widths and operatively connecting a first actuator to the linkage assembly. A first actuator is operatively connected to the linkage assembly and is operable to move the windrow shields between the open and closed positions. The first actuator is configured to dispose the first and second windrow shields into the closed position independent of the selected cut crop material opening widths established by the windrow shield positioning adjuster. The method additionally includes the acts of moving the windrow shields into the closed position upon movement of the first actuator in a first direction and deploying the transport wheels into an operative position wherein the transport wheels are in contact with a ground surface and the harvesting wheels are spaced from the ground surface.

In accordance with another aspect, a windrow shield positioning adjuster including a plurality of adjustment holes is provided on elongate portions of a pair of rotating crank members which rotate roughly between 0° and 90° alignment with respect to a longitudinal direction of the header chassis. A first actuator operates a third crank member a central control arm and the first and second lateral control arms to rotate the first and second crank members. During field operation, the elongate portions of the first and second crank members are substantially aligned at approximately 0° with respect to the longitudinal direction of the chassis, e.g., perpendicular to the forward direction of travel of the mower in the field. This arrangement aligns the array of holes in the first and second crank members in such a way that the position of the windrow shields can be adjusted for narrow windrows and wide swaths, as well as the lateral positioning of the windrows. In order to transition to road/transport width, the first actuator is extended or retracted (depending on the configuration of the system) to rotate the elongate portions of first and second crank members from approximately 0° field alignment to an approximately 90° road position with respect to the longitudinal direction of the chassis. In doing so, the windrow shields are rotated or folded inward toward each other to a position relatively parallel to the longitudinal direction of the chassis. Due to the substantially small angle assumed by the first and second lateral control arms, the near parallelism of the windrow shields does not vary greatly based on the width setting of the windrow shields. That is, the windrow shields fold to a closed position which allows for the transport wheels to be deployed regardless of whether the mower has been set for wide swath formation or narrow windrow formation. This allows the first actuator to utilize its stroke to open and close the windrow shields for all windrow width settings, thereby eliminating the need for operator intervention to switch the windrow shields from field to transport positions. Thus, the first actuator simply has to be coupled to a transport wheel actuator in order to ensure that the shields are folded before the transport wheels are deployed.

In accordance with yet another aspect, the first actuator is hydraulically coupled to a transport wheel deployment actuator. Thus, when converting from field to road operation, the hydraulic system will first supply fluid to the first actuator to rotate the elongate portions of the first and second crank members in a direction approximately 90° to the chassis to fold the windrow shields toward the chassis until the first actuator is substantially fully extended/retracted. At this point, the transport wheel actuator is deployed in order to move the transport wheels into operating/road position. When converting from road to field operation, the hydraulic system will provide fluid to the transport wheel actuator causing the transport wheels to raise upwardly for field operation. When the transport wheel actuator is sufficiently extended (or retracted depending on the cylinder setup), fluid is supplied to the first actuator to rotate the elongate portions of the first and second crank members to a position substantially aligned with the chassis trail frame thereby causing the windrow shields to unfold into their field position. That is, the entire operation of folding of the windrow shields and deployment of the transport wheel as well as the reverse operation, can be accomplished by activation of a single remote in-cab control or coupled to an existing function, transport or otherwise. Also, other systems may not have issues with interference between the windrow shields and a transport wheel arrangement and frame. In such case (e.g., in a non-lateral transport mower), but similar to the situation where lateral transport wheel frame interference is a potential problem, the shields need only fold in by the time the full changeover to transport has occurred whereby the front to rear length/depth of the mower is substantially reduced, e.g. for situations where the mower is backed into a shed of limited depth.

In accordance with yet another aspect, a windrow shield positioning mechanism comprises arcuate shaped elongate slots provided in elongate portions of first and second crank members of a linkage assembly. The windrow shield positioning mechanism further includes a first extendable and retractable actuator operatively connected to the linkage assembly and configured to move the windrow shields between open and closed positions. The windrow shield positioning mechanism further includes a windrow shield positioning adjuster including a pair of second and third independently extendable and retractable actuators. The second and third actuators adjust the opening width of the windrow shields by moving first and second lateral control arms of the linkage assembly along the arcuate shaped elongate slots.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Figure 1:
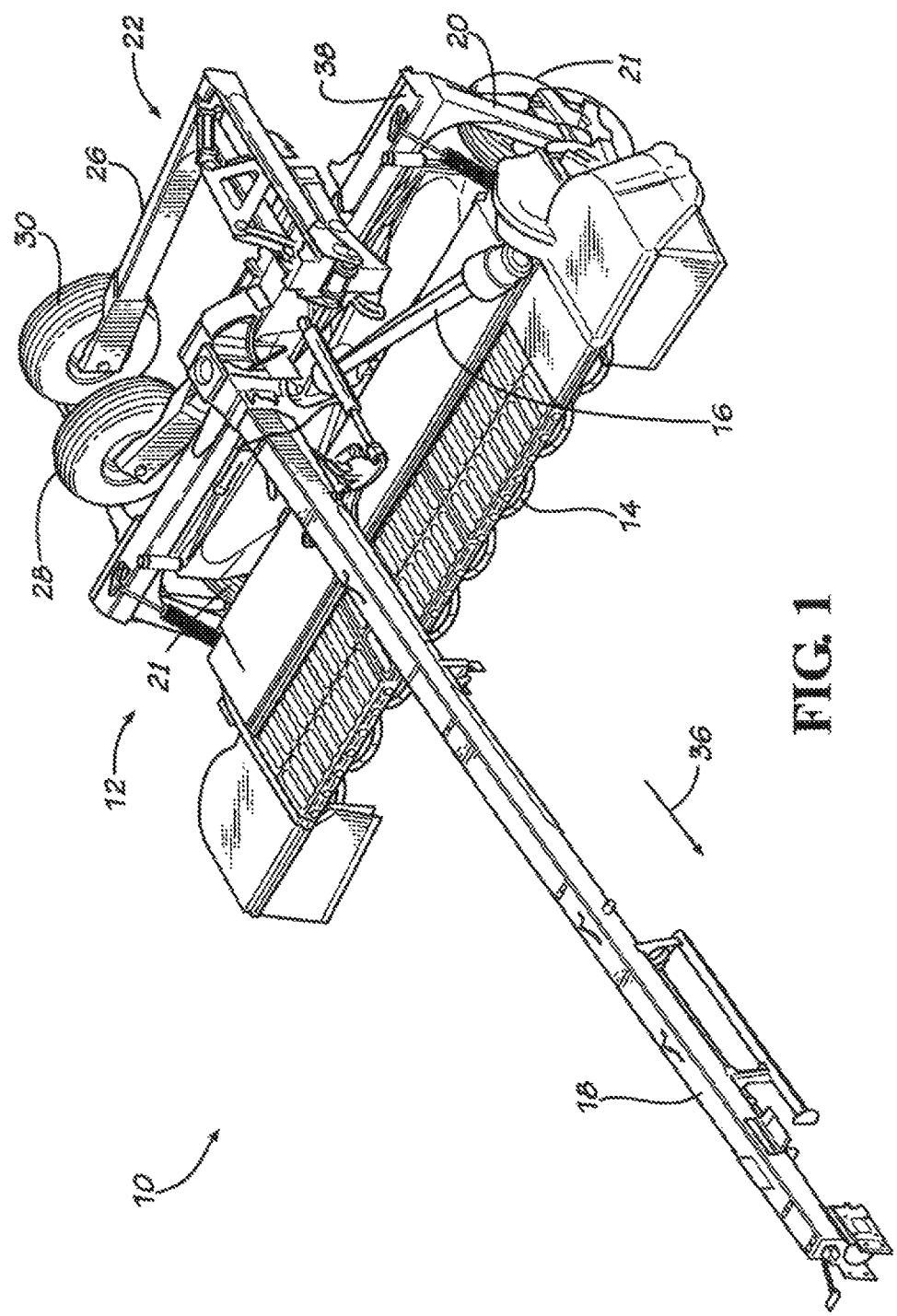
FIG. 1 is a perspective view of an agricultural harvester according to an aspect of the subject application in the form of a mower including a transport assembly in a stowed position.

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Referring now to the drawings, wherein aspects of the subject application are shown, FIGS. 1-8 illustrate several features of an agricultural harvester in the form of a pull-type center pivot disc mower conditioner (CPDMC) with which the windrow shield positioning mechanisms and windrow shield opening and closing mechanisms according to the subject application, discussed below, find beneficial application.

In FIG. 1 there is shown a perspective view of an agricultural harvester header according to an aspect of the subject application in the form of a mower 10, which can be attached to a tractor (not shown). Mower 10 generally includes a chassis 12, which carries a number of other components such as crop engaging blades 14, and drive components 16. Crop engaging blades 14 can be disc cutter blades 14 or a sickle bar, or another crop cutting device. A tongue 18 is pivotally connected to chassis 12, an end of which can be connected to the tractor. A field suspension system 20 supports mower 10 while mower 10 is in a field mode. Field suspension system 20 includes a pair of field or harvesting wheels 21 (FIGS. 1 and 2) which contact the ground surface during field or harvesting operations. Mower 10 additionally includes a transport assembly or arrangement 22, which, when deployed, provides the support for the transport of mower 10.

Additionally referring to FIGS. 2-8, transport arrangement 22 includes suspension elements 24 and 26, which respectively have transport wheels 28 and 30 connected to corresponding ends of frame or suspension elements 24 and 26. Suspension elements 24 and 26 are rotatable about an axis 32, when suspension element 26 is in the position shown in FIGS. 4-8. Additionally, suspension element 26 is rotatable about an axis 34 as it transitions from a stowed position illustrated in FIGS. 1-3 to the position shown in FIG. 4. Axis 32 is generally perpendicular to axis 34. The transport wheels 28, 30 are thus operatively attached to the chassis 12 and positionable between an operative position wherein the transport wheels 28, 30 are in contact with a ground surface and the harvesting wheels are in a retracted position spaced from the ground surface and an inoperative position wherein the transport wheels are in a retracted position spaced from contact with the ground surface and the harvesting wheels are in contact with the ground surface. For example, the system may include a transport wheel actuator 39 (FIG. 8) for positioning the transport wheels 28, 30 between operative and inoperative positions.

When suspension element 26 is in the stowed position it is generally above, or at least vertically elevated above, suspension element 24. Additionally, suspension element 26 is somewhat shorter than suspension element 24, as can be particularly seen in FIG. 2, where it can also be seen that suspension element 26 is positioned such that wheel 30 is behind wheel 28 when transport arrangement 22 is in a stowed position.

Figure 2:
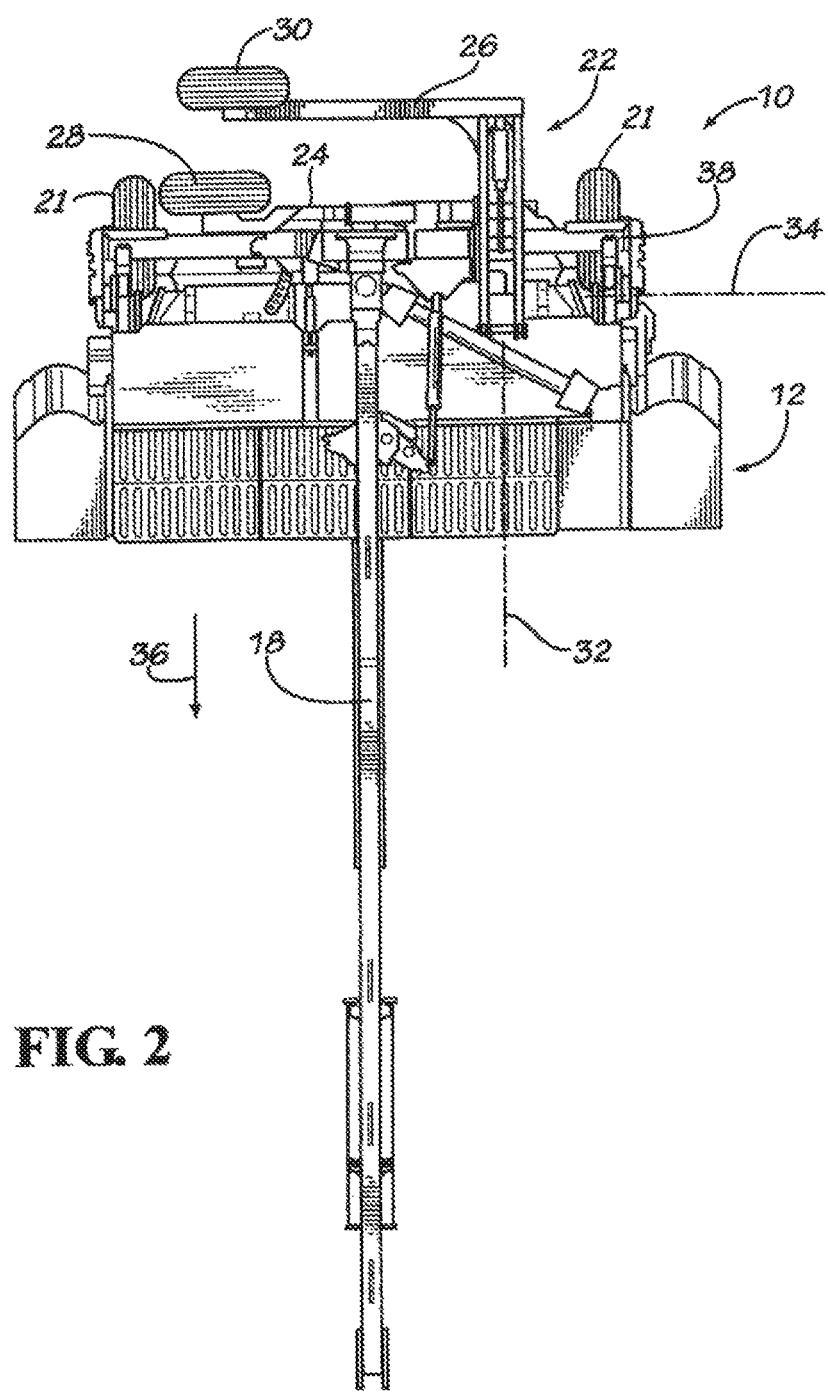
FIG. 2 is a top view of the mower of FIG. 1.
Figure 3:
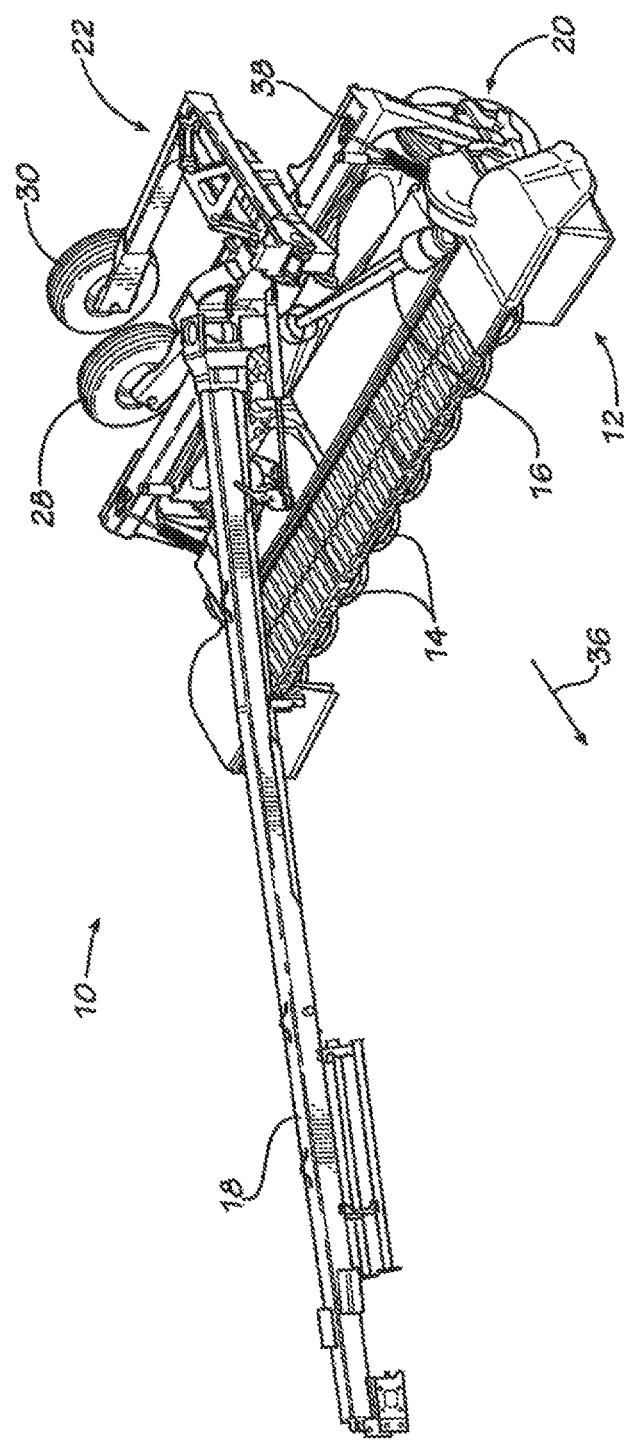
FIG. 3 is a perspective view of the mower of FIG. 1, with a trailing tongue shifted to a field use position.

A sequence of movements of the elements of mower 10 will now be discussed with references to the various figures. FIGS. 1 and 2 illustrate transport arrangement 22 in a stowed position and tongue 18 is angularly positioned in a substantially forward direction 36. This is a configuration in which mower 10 can be used, but generally mower 10 will be used with tongue 18 located to either side, such as that shown in FIG. 3. FIG. 3 illustrates a predetermined position for tongue 18 to be located to allow the needed clearance for suspension element 26 to rotate about axis 34, as shown fully deployed, in FIG. 4. Initially the field wheels associated with field suspension system 20 are fully extended to lift chassis 12.

Figure 4:
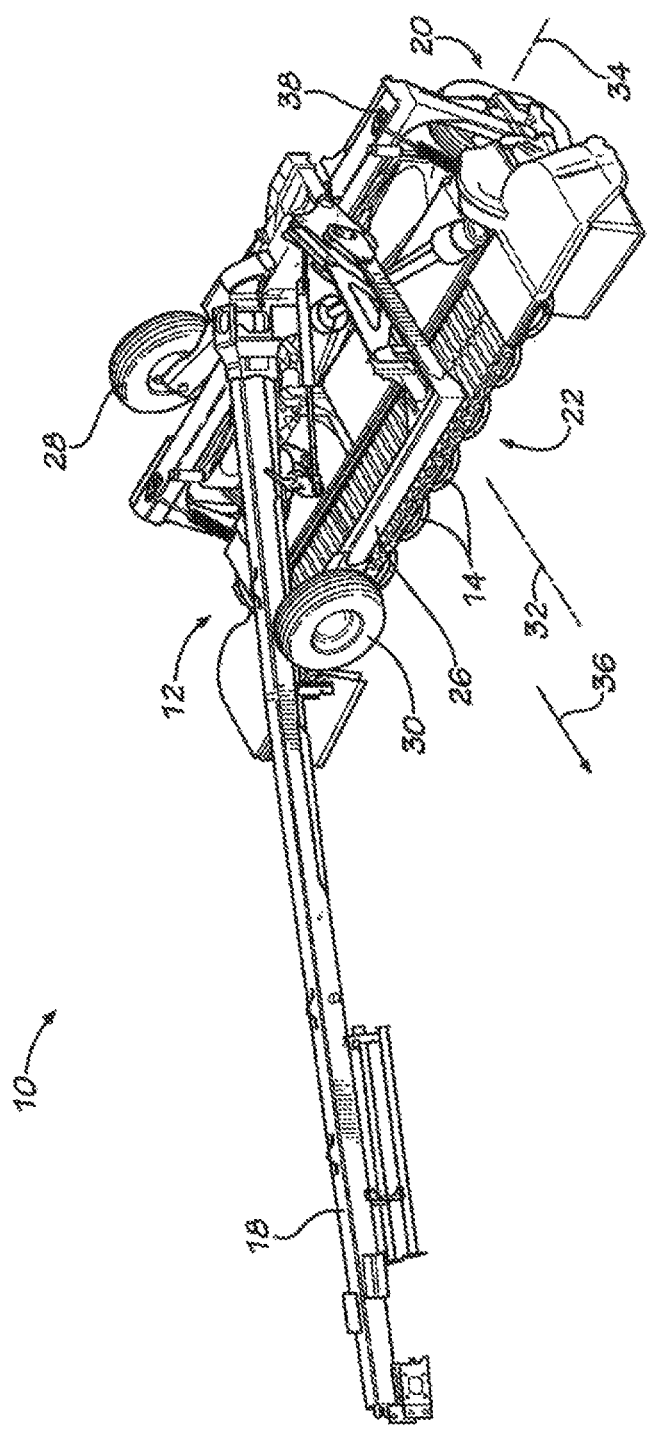
FIG. 4 is a perspective view of the mower of FIG. 1 illustrating the transport assembly being deployed.
Figure 5:
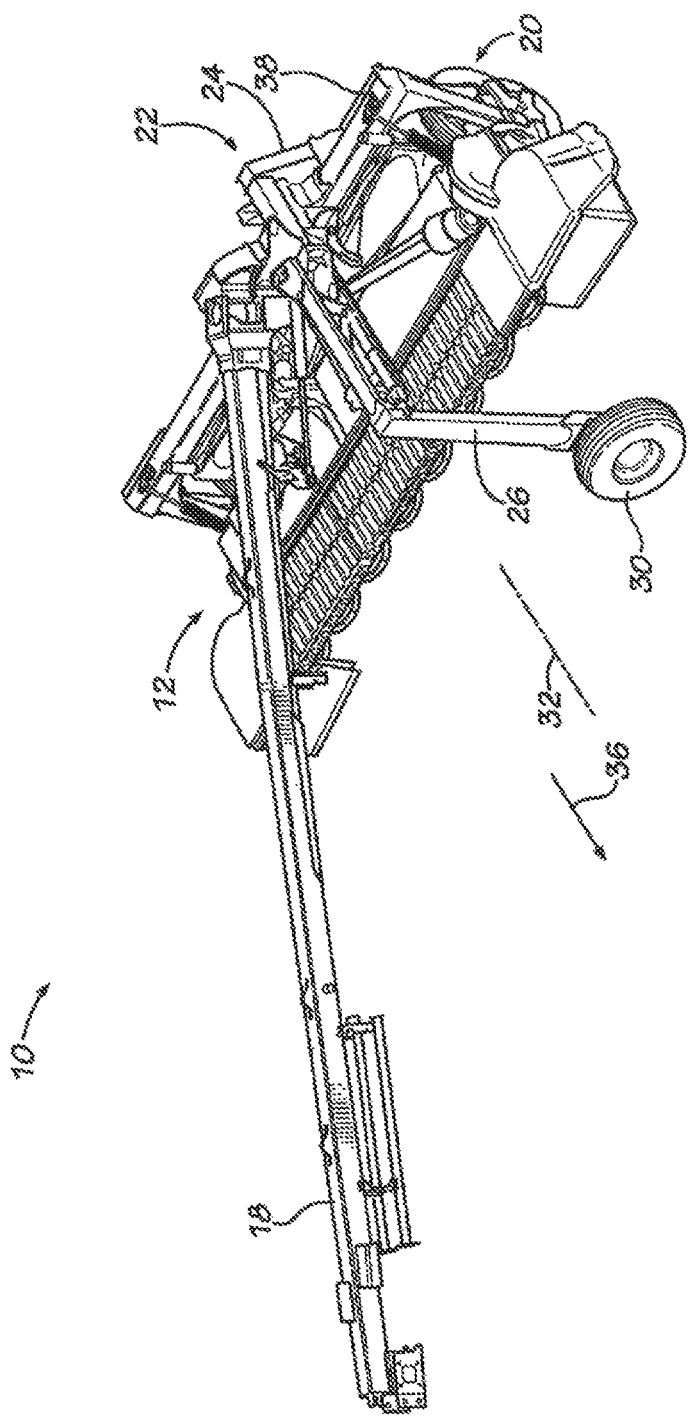
FIG. 5 is another perspective view of the mower of FIG. 1 illustrating the transport assembly being further deployed and lifting the chassis of the mower.
Figure 7:
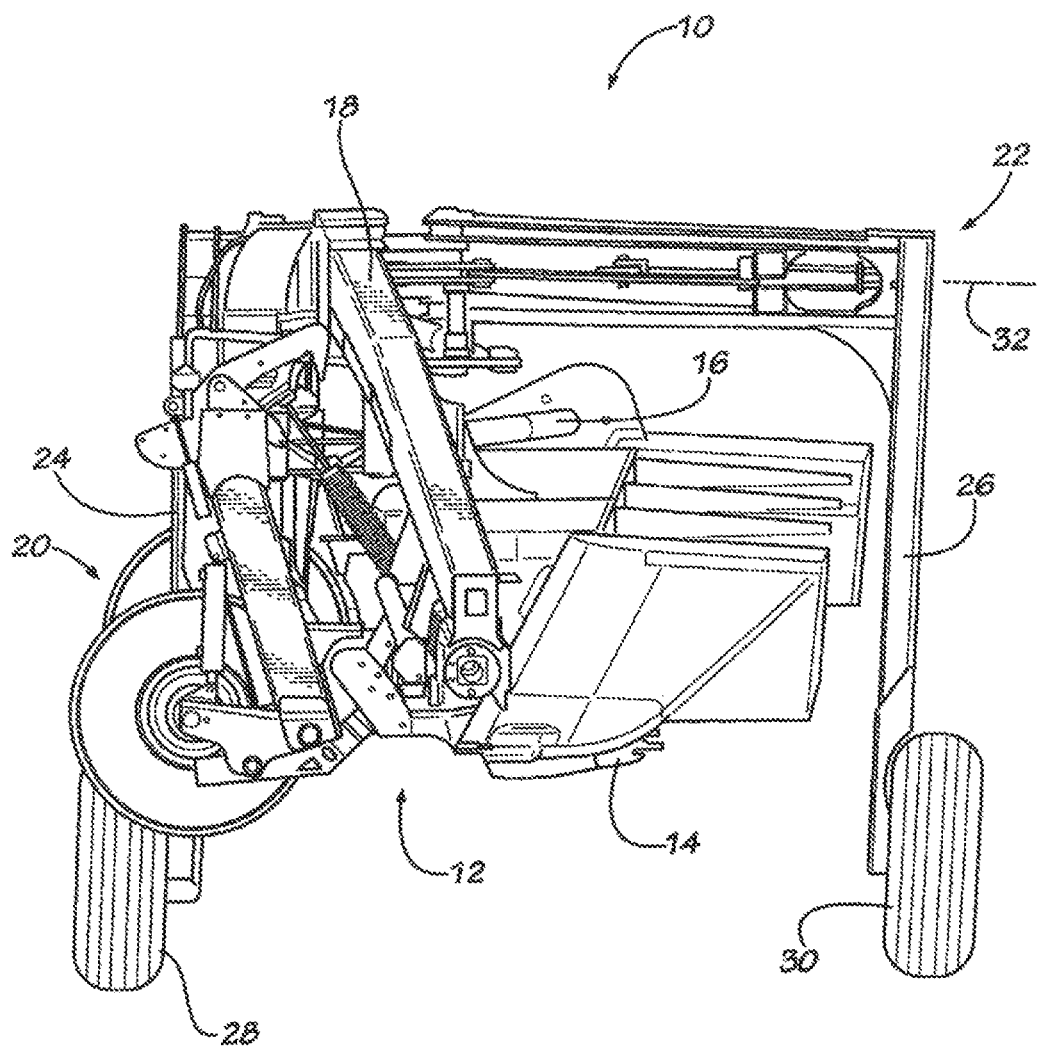
FIG. 7 is a front view of the mower of FIG. 1 from the perspective of the operator in a tractor illustrating the transport assembly being deployed for transporting the mower.
Figure 8:
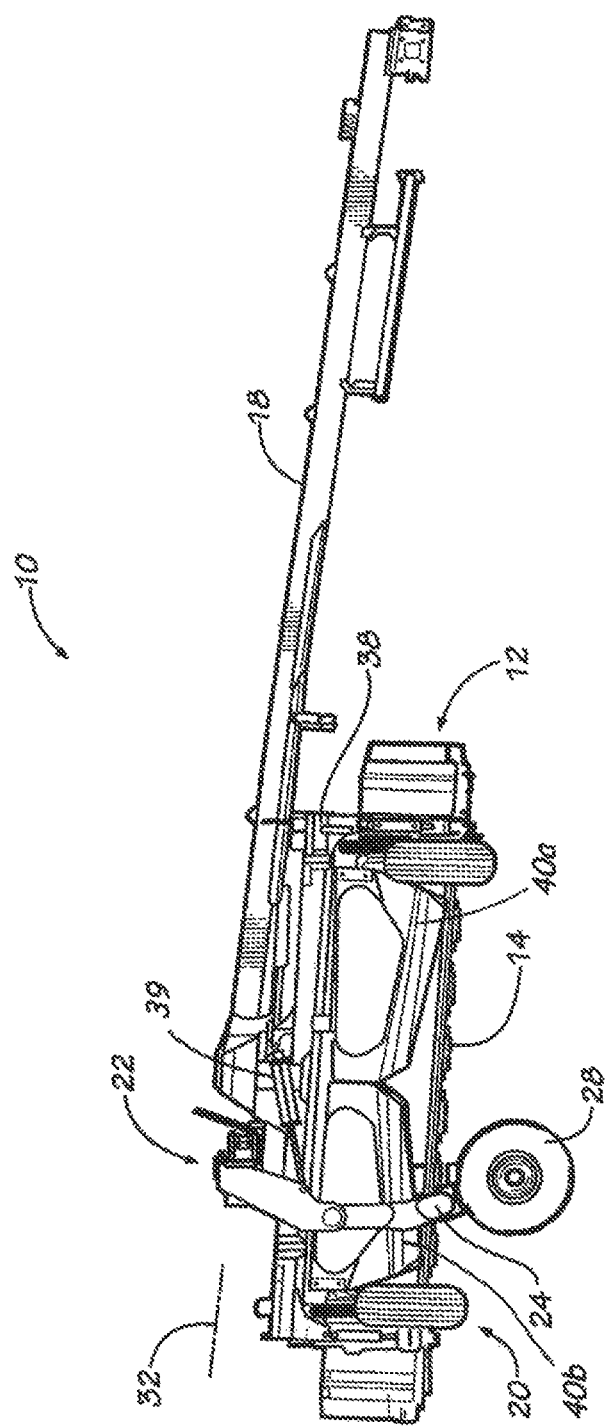
FIG. 8 is a side view of the mower of FIG. 1 illustrating the transport assembly being fully deployed having lifted the chassis of the mower.

Once transport arrangement 22 is positioned as shown in FIG. 4, then both suspension elements 24 and 26 rotate about axis 32 causing wheels 28 and 30 to contact the ground thereby lifting chassis 12 so that field suspension system 20 is lifted off of the ground. Field suspension system 20 can be coordinated to also lift its wheels while or after wheels 28 and 30 contact the ground. The harvesting wheels 21 of field suspension system 20 are raised to provide ground clearance by the retraction of the lift cylinders associated with field suspension system 20 (as can be seen in FIGS. 7 and 8). A result of this step is that transport arrangement 22 is fully deployed as seen in FIG. 5 and is in the transport position.

Figure 6:
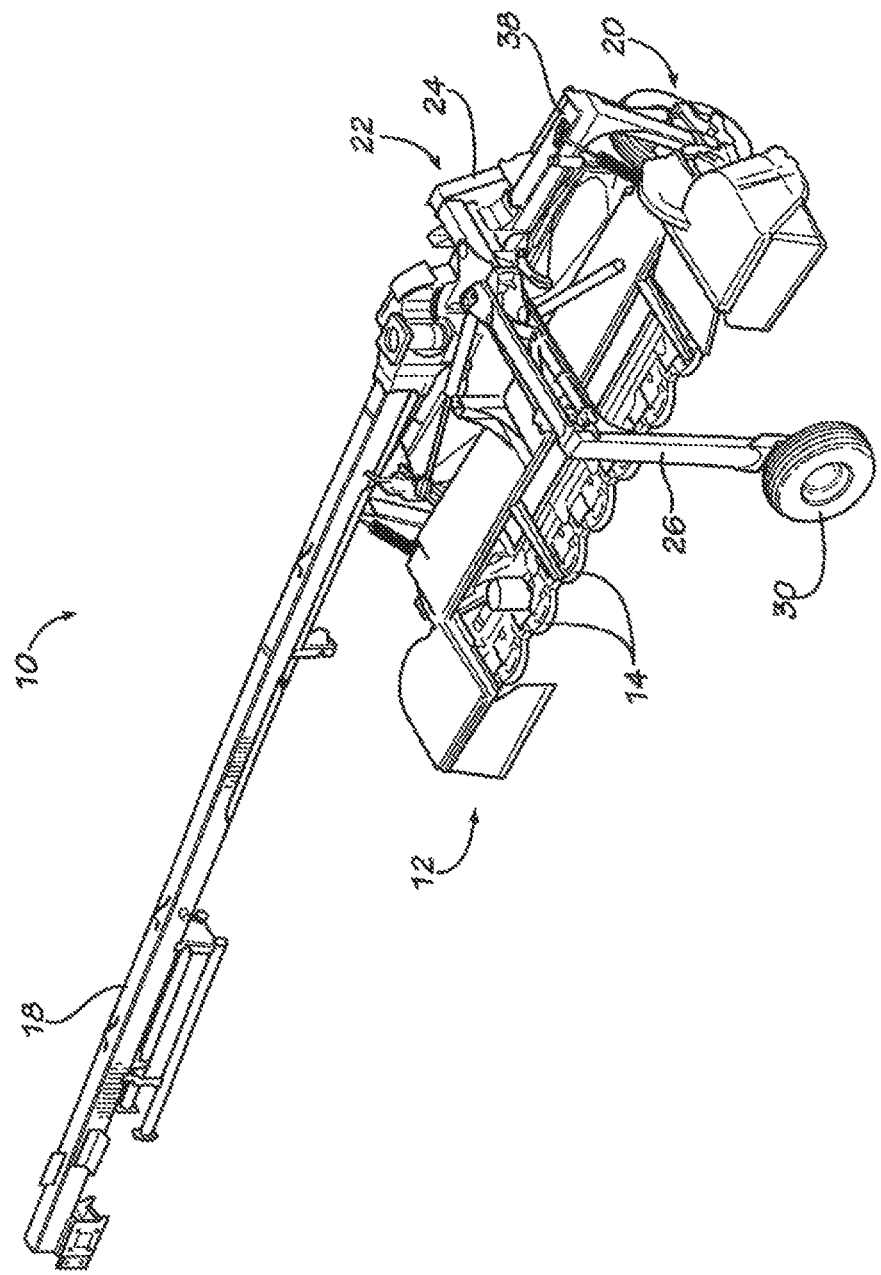
FIG. 6 is yet another perspective view of the mower of FIG. 1 illustrating the trailing tongue of the mower being pivoted to a transport position.

The next step is that tongue 18 is swung to a transport position as shown in FIG. 6. This step has to wait on the full deployment of transport arrangement 22 to prevent mower 10 from tipping to one side. FIGS. 7 and 8 show mower 10 in the transport mode respectively from the operator viewpoint and the right hand side of mower 10.

The steps needed to configure mower 10 for field use are the reverse of those just discussed in order to transition from the transport position to the stowed position of transport arrangement 22. The position of tongue 18 in the transport mode is at a relatively small angle to the tracking of mower 10, as seen in FIG. 7, so as to position the hitch in the desired location for connection with the tractor.

Transport arrangement 22 is coupled to chassis 12 and more particularly to a trail frame 38, which is part of chassis 12. The coupling of transport arrangement 22 is offset to the side of the centerline of mower 10. The folding mechanism of transport arrangement 22 is provided to allow at least portions of transport arrangement 22 to be stowed above and to the rear of the trail frame 38 during field operations. Upon placing the mower 10, e.g., a center pivot disc mower conditioner (CPDMC) in the full field left position, the mechanism of transport arrangement 22 rotates about a pivot axis 34 that is parallel to or substantially parallel to the trail frame 38 (or the axis of the field wheels). When this rotation has been completed, a secondary rotation takes place about axis 32 which is above and perpendicular to the trail frame 38 and the field wheel axis. This action rotates transport wheels 28 and 30 from their position above trail frame 38 to a position below trail frame 38 and in contact with the ground.

When this action is complete, the header/mower is then rotated to a position essentially in-line with tongue 18, thus allowing a narrow transport for public roads. The acts to transition from field operation to lateral transport operation are thus: (1) fully lift chassis 12 to the non-mowing position by extending the field wheels of field suspension system 20; (2) rotate chassis 12 to the full field left position; (3) extend a primary lateral transport cylinder to rotate suspension element 26 along with wheel 30 from a position above and behind the trail frame 38 to a position above and ahead of the trail frame 38; (4) extend a secondary lateral transport cylinder to rotate suspension elements 24 and 26 with wheels 28 and 30 down below the trail frame 38, with wheel 28 being behind the trail frame 38 and wheel 30 being in front of the trail frame 38; and (5) initiate the system to complete the rotation of chassis 12 to the full lateral transport position and raise the field wheels. The steps to transition from lateral transport to field operation are the reverse of the foregoing the actions starting with act 5 and working backward to act 1.

Moving the transport arrangement 22 into an operative state involves the act of moving the transport wheel 30 from a stowed position above and behind the trail frame 38 to a position ahead of the trail frame 38 and the header about axis 34 generally parallel to the trail frame 38 and the field/harvesting wheel axis. There is also the action of moving the transport wheels 28, 30 from a position above the trail frame 38 to a position below the trail frame 38, where the transport wheel 30 is in front of the header and the transport wheel 28 is behind the header (in field position), about an axis 32 perpendicular to the trail frame 38 and the field/harvesting wheel axis. That is, the system stows the transport wheels 28 and 30 above and behind the trail frame 38 while having the ability to rotate the transport wheel 30 to a position ahead of the header and transport wheel 28 behind the header. Any suitable devices can be used to actuate the transport arrangement movements, including, without limitation, hydraulic, pneumatic or electromechanical cylinders or other actuators, as well as and linear motors and rotational motors, among others.

FIG. 8 further shows that chassis 12 carries a pair of spaced apart windrow shields 40a, 40b, discussed in greater detail below, for establishing the width and position of the cut crop swath or windrow discharged by mower 10. It will be understood that windrow shields 40a, 40b must be placed into a closed position prior to deployment of the transport wheel actuator 39 of transport arrangement 22 otherwise the windrow shields may suffer damage as a result of contact with the frame of the transport arrangement during deployment thereof into the operative position. In the absence of the windrow shield positioning mechanisms of the subject application, discussed below, placement of the windrow shields in desired open and closed positions would need to be performed manually. That is, the tractor operator would have to dismount the tractor and physically move and secure the windrow shields into desired open and closed positions. Such manual windrow shield positioning is time-consuming and inefficient.

Figure 9:
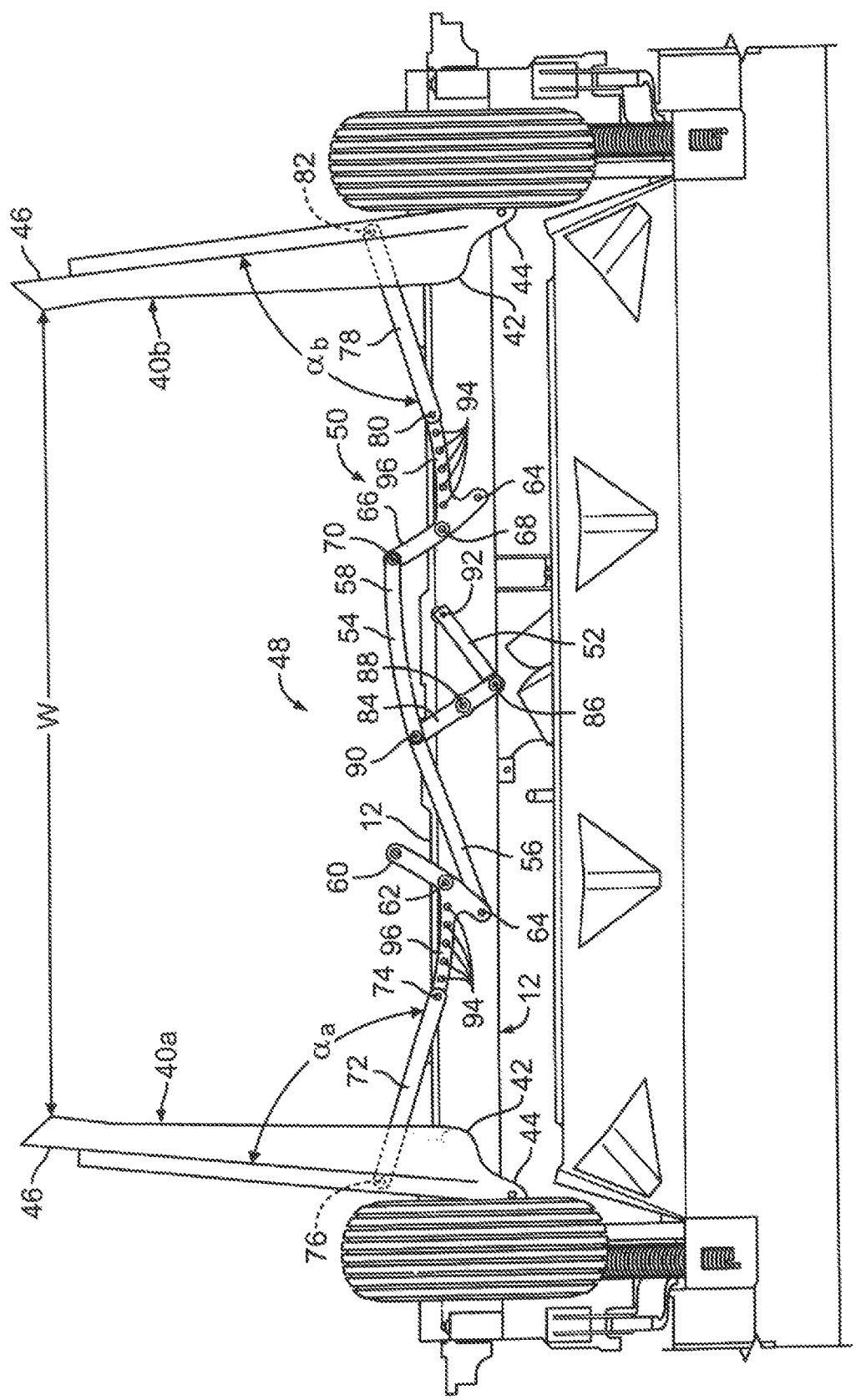
FIG. 9 is a bottom plan view of a header for an agricultural harvester according to an aspect of the subject application with the windrow shields thereof shown in a first position.

Referring to FIG. 9, there is shown a bottom view of a mower/header 10 according to an aspect of the subject application. As noted above, the mower includes a chassis 12 to which is pivotably attached a pair of spaced apart first and second windrow shields 40a, 40b. More specifically, proximal ends 42 of the windrow shields are pivotably connected to chassis 12 at vertically oriented pivots 44 while the adjustable space between distal ends 46 of the windrow shields define an opening width "W" for the passage of cut crop material in the form of a windrow or swath discharged by the mower.

As described in detail below, the subject application provides a windrow shield positioning mechanism including a linkage assembly 48 that couples the first and second windrow shields 40a, 40b for movement between an open position and a closed position. In addition, the windrow shield positioning mechanism includes a windrow shield positioning adjuster 50 which is configured to dispose the distal ends of the windrow shields in a plurality of cut cop material opening widths "W" when the windrow shields are in an open position. The windrow shield positioning mechanism further includes a first actuator 52 which is operatively connected to the linkage assembly 48 and the chassis and is configured to move the windrow shields between open and closed positions independent of the cut crop material opening width established by the windrow shield positioning adjuster 50. The first actuator 52 may be any extensible and retractable actuator of hydraulic, pneumatic or electromechanical construction and operation and is remotely operated in-cab by the tractor operator. Consequently, the tractor operator need not dismount the tractor in order to manually place the windrow shields 40a, 40b into the open and closed positions for field and transport operations. Additionally, the system for folding the windrow shields to a transport position independent of the windrow width positioning can use a variety of pivot arms, cranks, actuators (electric, pneumatic, hydraulic, linear, rotary, angular) and so on. These components can be of similar or dissimilar lengths and may use any combination of joints.

As shown in FIG. 9, linkage assembly 48 includes a central control arm 54 having first and second ends 56, 58. A first crank member 60 of the linkage assembly is pivotably connected to the chassis at pivot 62 and the first end 56 of the central control arm 54 at pivot 64. Similarly, a second crank member 66 of the linkage assembly is pivotably connected to the chassis at pivot 68 and the second end 58 of the central control arm 54 at pivot 70. The linkage assembly further includes a first lateral control arm 72 pivotably connected to the first crank member 60 at selectively positionable pivot 74 (further discussed below) and the first windrow shield 40a at pivot 76. Likewise, the linkage assembly further includes a second lateral control arm 78 pivotably connected to the second crank member 66 at selectively positionable pivot 80 (further discussed below) and the second windrow shield 40b at pivot 82.

The first actuator 52 is operatively connected to the central control arm 54 via a third crank member 84 which is pivotably connected to the first actuator at pivot 86, the chassis at pivot 88 and the central control arm at pivot 90. The first actuator is also pivotably connected to the chassis at pivot 92. Movement of the third crank member 84 in a first direction causes movement of the windrow shields 40a, 40b toward the open position and movement of the third crank member in a second direction causes movement of the windrow shields toward the closed position. Owing to the geometry of the first and second crank members 60, 66, the first and second windrow shields 40a, 40b may open to angles $\alpha_a$ and $\alpha_b$ of about 80°-90° and preferably about 84° with respect to the longitudinal direction of the chassis 12 when fully opened and with the windrow shield positioning adjuster 50, discussed below, set to its widest opening position. It is contemplated that the first and second windrow shields may be constructed and arranged to open more or less than 84° with respect to the longitudinal direction of the chassis 12 when fully opened.

According to an aspect, the windrow shield positioning adjuster 50 comprises a plurality of spaced apart holes 94 provided in elongate portions 96 of the first and second crank members 60, 66. Elongate portions 96 are desirably arcuate shaped elongate portions whereby the spaced apart holes 94 are arrayed in an arc within the elongate portions 96 for reasons discussed below. As noted above, pivots 74 and 80 are selectively positionable. The purpose of such selective positioning is to enable the windrow shields to be independently adjusted toward and way from one another to control both the windrow opening width "W" as well as the lateral positioning of such windrow opening, e.g., relative to the left or right, with respect to the direction of travel of the mower 10. In order to establish desired windrow shield positioning, the operator places the pivot pins of pivots 74, 80 in desired ones of the spaced apart holes 94 whereby the first and second lateral control arms 72, 78 can be disposed at positions suitable to place the distal ends 46 of the windrow shields 40a, 40b at desired windrow opening widths "W" and desired lateral locations. That is, the plurality of spaced apart holes 94 provided on the elongate portion 96 of the first crank member 60 are adapted to receive a first end of the first lateral control arm 72 to establish a desired open position of the first windrow shield 40a. Likewise, the plurality of spaced apart holes 94 provided on the elongate portion 96 of the second crank member 66 are adapted to receive a first end of the first lateral control arm 78 to establish a desired open position of the second windrow shield 40b.

Figure 10:
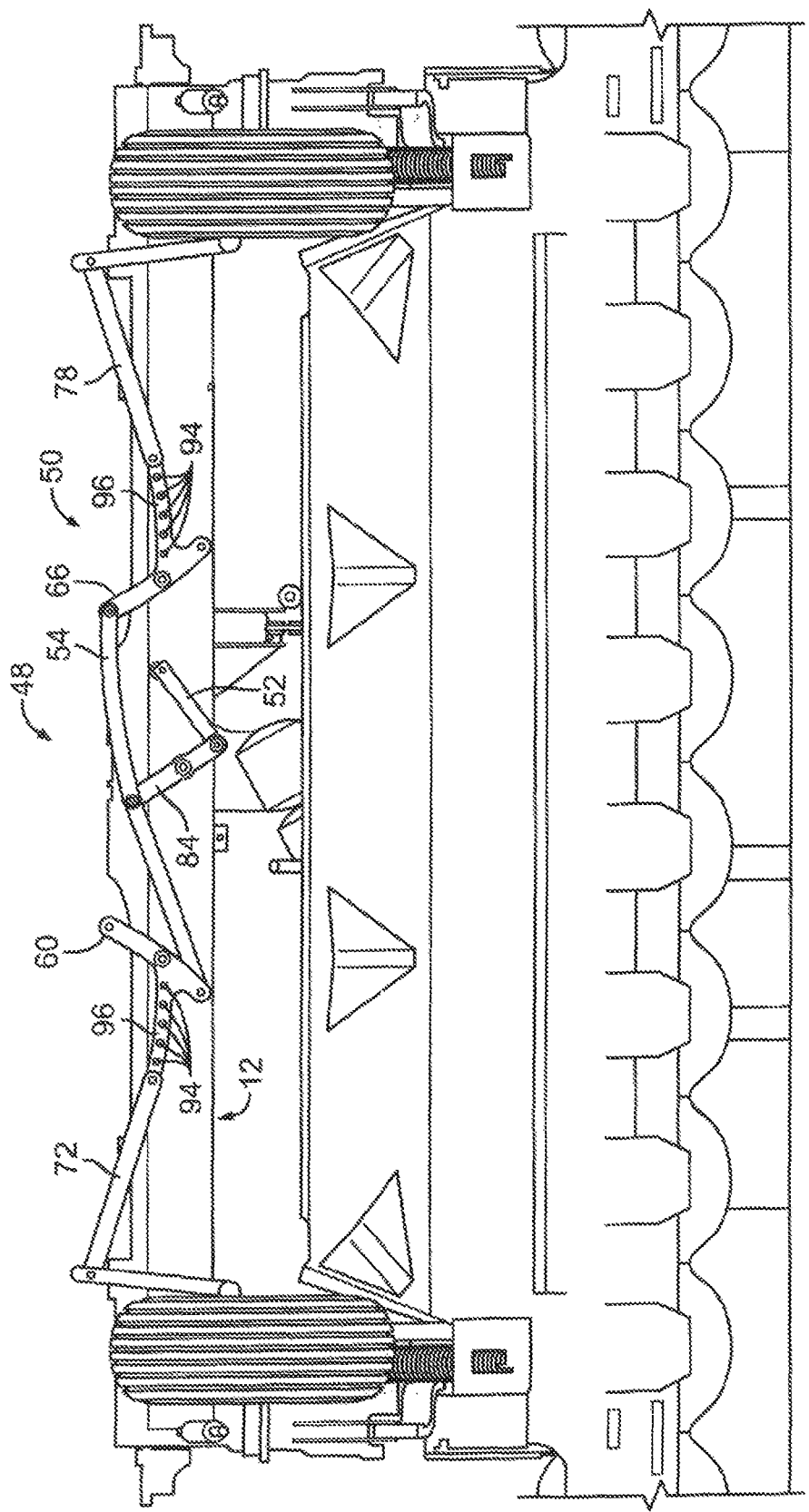
FIG. 10 is a view similar to FIG. 9 with the windrow shields of the header omitted to illustrate the construction of a windrow shield positioning mechanism and a windrow shield opening and closing mechanism according to an aspect of the subject application.
Figure 11:
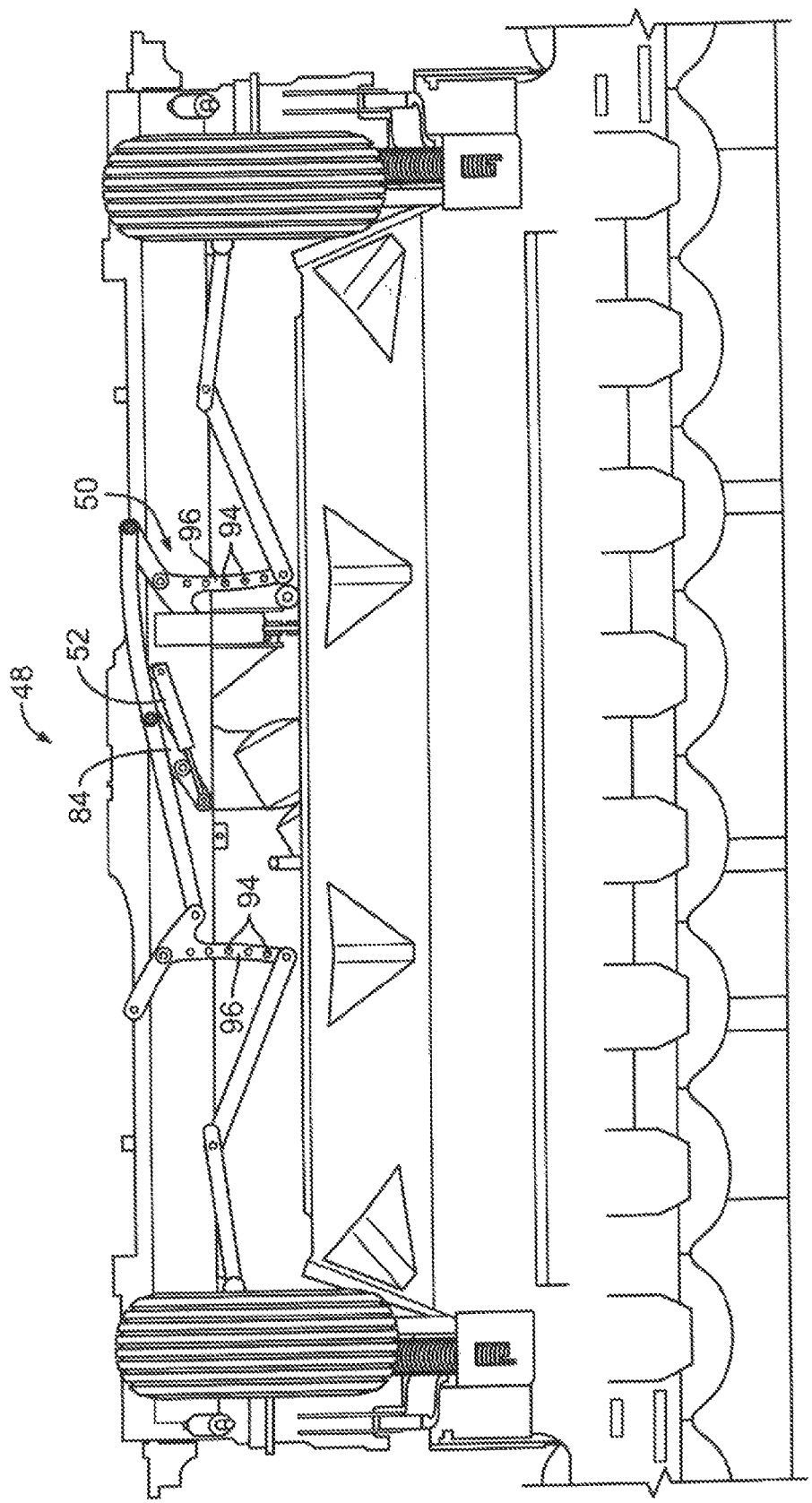
FIG. 11 is a view similar to FIG. 10 showing the windrow shield opening and closing mechanism in a second position.

Referring to FIG. 10, there is shown the windrow shield linkage assembly 48 and the windrow shield positioning adjuster 50 with the windrow shields omitted for clarity of illustration. As shown in FIG. 10, the windrow shield linkage assembly 48 and the windrow shield positioning adjuster 50 are disposed in a manner similar to that shown in FIG. 9, e.g., with the windrow width being essentially at full swath width and the first actuator 52 in a retracted position. In contrast, FIG. 11 shows the windrow shield linkage assembly 48 in a position where the windrow shields would be at an essentially fully closed position with the first actuator 52 in an extended position. Alternatively, the connection between the first actuator 52 and the third crank member 84 may be different from that depicted in FIGS. 9-11 and still achieve the same results. That is, the first actuator pivot 86 shown in FIG. 9 may be located between pivots 88 and 90 whereby extension of the first actuator 52 results in opening of the windrow shields and retraction of the first actuator results in closing of the windrow shields.

Figure 12:
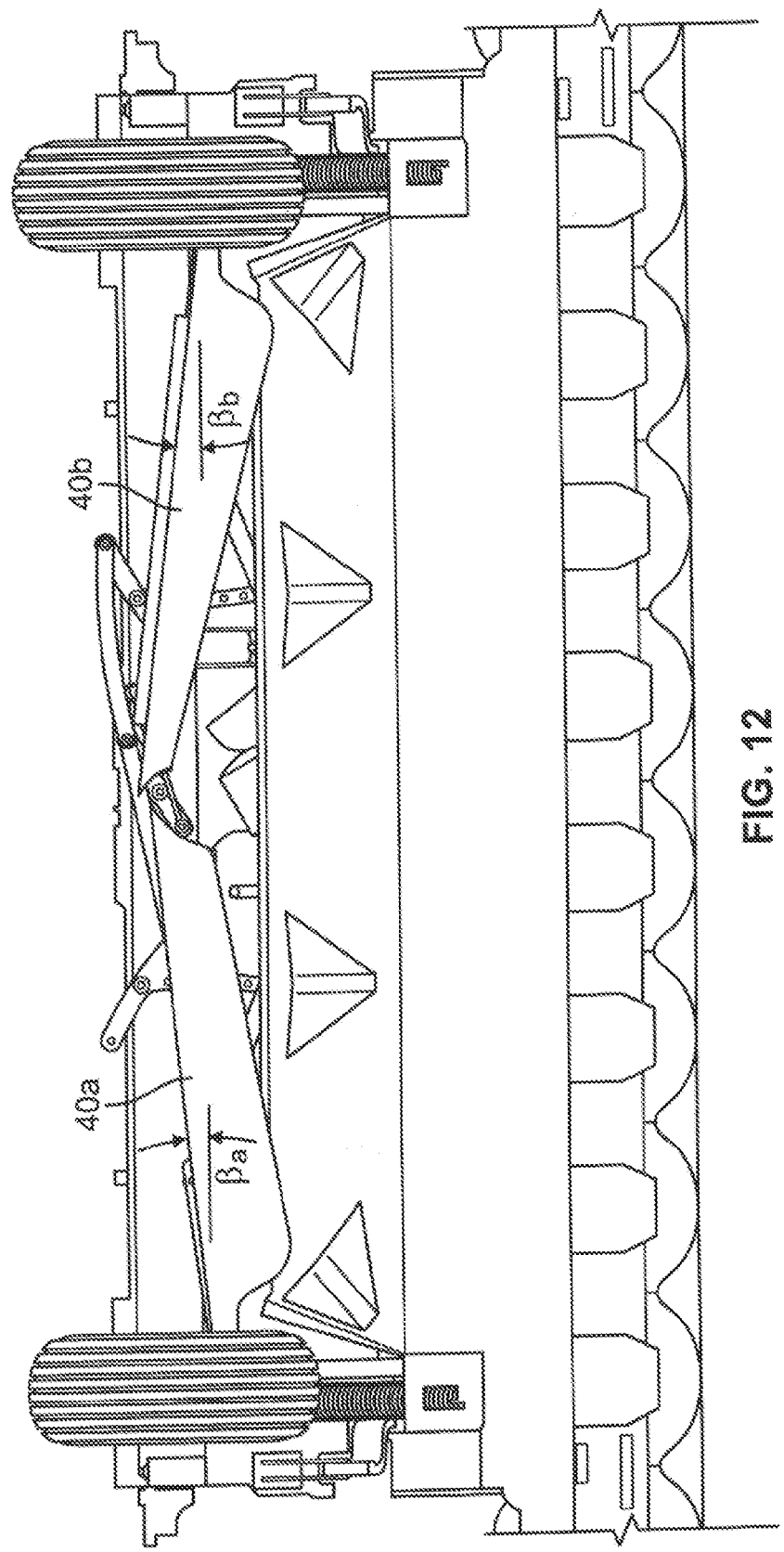
FIG. 12 is a bottom plan view of a header for an agricultural harvester according to an aspect of the subject application with the windrow shields thereof shown in a second position.

FIG. 12 shows the windrow shields 40a and 40b as they would appear when the windrow shield linkage assembly 48 is positioned in the manner shown in FIG. 11. That is, the windrow shields 40a, 40b would be essentially fully closed with the distal end of windrow shield 40b slightly overlapping the distal end of windrow shield 40a. In such position, the windrow shields are safely folded inwardly whereby the frame of the transport arrangement 22 (FIG. 8) may pass downwardly over the windrow shields without contacting or damaging them. As shown in FIG. 12, the windrow shields 40a, 40b are not quite collinear with respect to one another. More specifically, due to the geometry of the first and second crank arms 60, 66 (FIG. 9) the first windrow shield 40a assumes a closed position wherein it lies at an angle $\beta_a$ of about 10.5° with respect to the longitudinal direction of the chassis 12 and the second windrow shield 40a assumes a closed position wherein it lies at an angle $\beta_b$ of about 12.0° with respect to the longitudinal direction of the chassis 12. It will be understood, however, that the crank arms 60, 66 may be constructed and arranged whereby the first and second windrow shields 40a, 40b may be essentially collinear when closed, e.g., they may lie at an angle of about 0° with respect to the longitudinal direction of the chassis when in the closed position.

Referring to FIGS. 10 and 11, the adjustment holes 94 are provided on the elongate portions 96 of rotating crank members 60, 66 which rotate roughly between 0° and 90° alignment with respect to the longitudinal direction of the chassis 12. The third crank member 84 is operated by the first actuator 52, along with the central control arm 54 and the first and second lateral control arms 72, 78, to rotate the first and second crank members 60, 66. During field operation, the elongate portions 96 of the first and second crank members 60, 66 are substantially aligned at approximately 0° with respect to the longitudinal direction of the chassis 12, e.g., perpendicular to the forward direction of travel of the mower in the field. This arrangement aligns the array of holes in the first and second crank members 60, 66 in such a way that the position of the windrow shields 40a, 40b can be adjusted for narrow windrows and wide swaths, as well as the lateral positioning of the windrows.

In order to transition to road/transport width, the first actuator 52 is substantially fully extended or retracted (depending on the configuration of the system) to rotate the elongate portions 96 of first and second crank members 60, 66 from approximately 0° field alignment (FIGS. 9 and 10) to an approximately 90° road position (FIG. 11) with respect to the longitudinal direction of the chassis 12. In doing so, the windrow shields are rotated or folded inward toward each other to a position relatively parallel to the longitudinal direction of the chassis 12. Due to the relatively small angle assumed by the first and second lateral control arms 72, 78, the near parallelism of the windrow shields does not vary greatly based on the width setting of the windrow shields. That is, the windrow shields fold to a closed position which allows for the transport wheels 28, 30 to be deployed regardless of whether the mower 10 has been set for wide swath formation or narrow windrow formation. This allows the actuator 52 to utilize substantially its entire stroke to open and close the windrow shields for all windrow width settings, thereby eliminating the need for operator intervention to switch the windrow shields from field to transport positions. Thus, the actuator 52 simply has to be coupled to the transport wheel actuator 39 in order to ensure that the shields are folded before the transport wheels are deployed, as discussed below.

Figure 13:
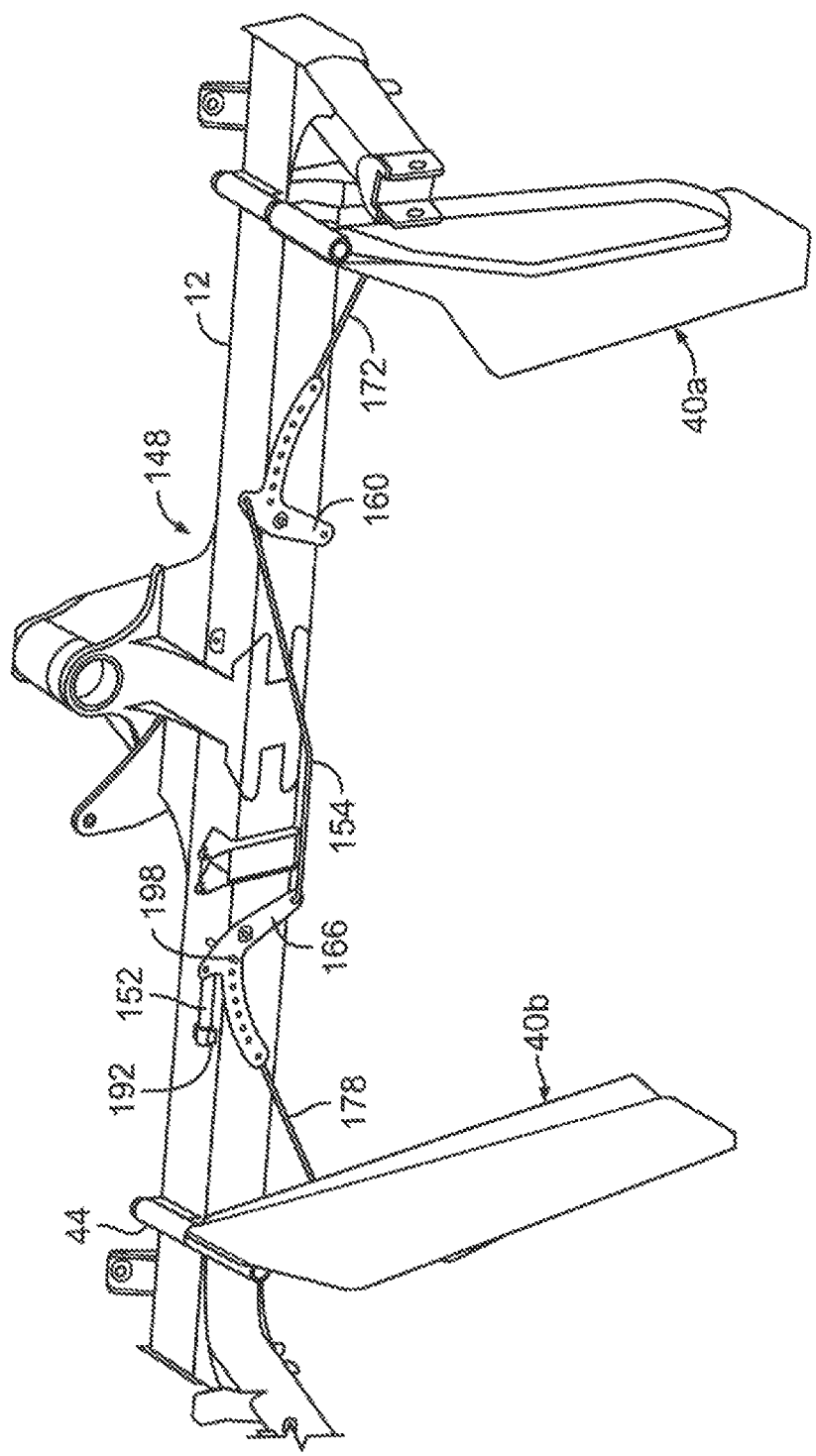
FIG. 13 is a bottom perspective view of a portion of a header for an agricultural harvester according to another aspect of the subject application with the windrow shields thereof shown in a first position.

FIG. 13 illustrates a further aspect of the windrow shield linkage assembly of the subject application identified generally by reference 148. Assembly 148 shares several features in common with windrow shield linkage assembly 48. Accordingly, only the essential features of assembly 148 and those features thereof whose construction and/or operation materially depart from those described above, or are otherwise necessary for a proper understanding of the subject application, will be described in detail in connection with FIG. 13.

Windrow shield linkage assembly 148 includes a central control arm 154, first and second crank members 160, 166 and first and second lateral control arms 172, 178 constructed and arranged substantially similarly to their counterparts shown in FIG. 9. Unlike the aspect shown in FIG. 9, however, movement of the central control arm 154 is not effectuated by a third crank member. In this regard, FIG. 13 illustrates a first actuator 152 pivotably connected at one end thereof via pivot 192 to the chassis 12 and at the other end thereof to the second crank member 166 at pivot 198. Although not shown, first actuator 152 may be connected to both the first and second crank members 160, 166 via an unillustrated elongate rod or similar member. As depicted in FIG. 13, first actuator 152 is in a retracted state resulting in windrow shields 40a, 40b being disposed in an open position with respect to chassis 12. As will be appreciated, extension of first actuator 152 will result in closing of the first and second windrow shields. It will also be understood that the first actuator 152 may be positioned on the chassis 12 and connected to either the first and/or second crank members 160, 166 such that extension rather than retraction of the first actuator causes windrow shields 40a, 40b to assume an open position.

As shown in FIG. 13, the central control arm 154 is connected at its opposite ends to the first and second crank members 160, 166. Accordingly, extension and retraction of the first actuator 152 causes coordinated movement of the first and second crank members 160, 166. In particular, movement of the first actuator and the first and second crank members in a first direction causes movement of the windrow shields toward an open position and movement of the first actuator and the first and second crank members in a second direction causes movement of the windrow shields toward a closed position.

Figure 14:
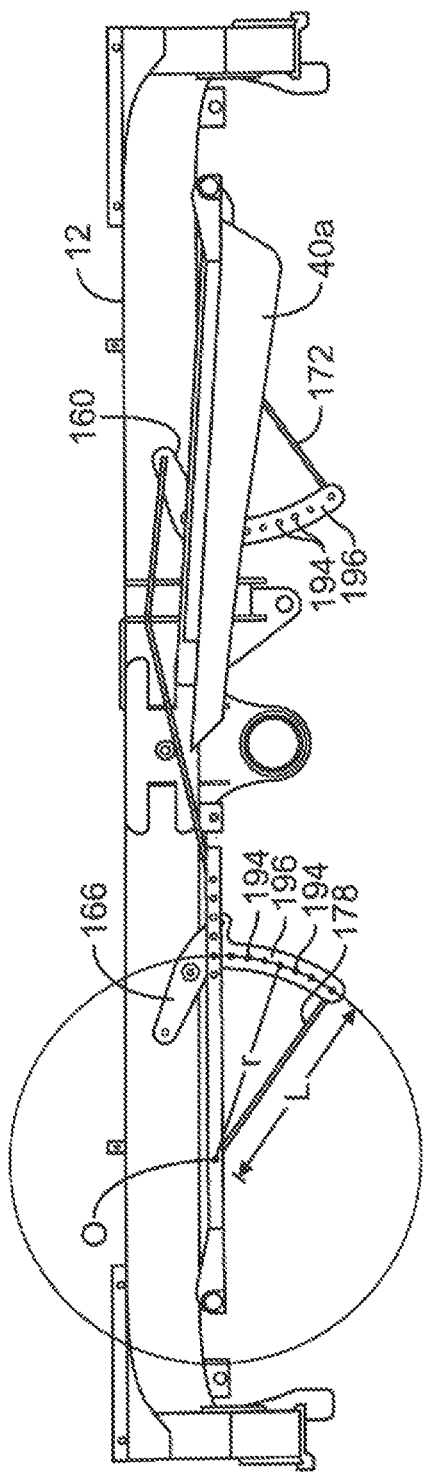
FIG. 14 is a bottom plan view of the header of FIG. 13 illustrating the geometry of the windrow shield positioning mechanism and a windrow shield opening and closing mechanism.

Referring to FIG. 14, there is shown an arrangement corresponding to that of FIG. 13 and also illustrating the geometry of spaced apart holes 94 provided along the arcuate elongate portion 196 of the second crank member 166 (which applies as well to that of the holes 194 provided along the arcuate elongate portion 196 of the first crank member 160). As noted above, the first and second lateral control arms 172, 178 are pivotably connected to the first and second windrow shields 40a, 40b. In addition, the first and second lateral control arms 172, 178 are pivotably and selectively connected to the arcuate shaped elongate portions 196 of the first and second crank members 160, 166 at holes 194, That is, the first and second lateral control arms 172, 178 are placed into selected ones of the holes 194 to establish the respective positions of the windrow shields and thus the opening width "W" when the shields are opened by first actuator 152 (FIG. 13).

The radius "r" of the array of holes 194 in the arcuate elongate portions 196 of the first and second crank members 160, 166 is equal to the length "L" of the of the lateral control arms 172, 178 as measured from a central point "O", e.g., the point at which the lateral control arms are pivotably connected to the windrow shields. That is, a curve defined by the plurality of spaced apart holes 194 of the arcuate shaped elongate portion 196 of first crank member 160 has a radius equal to the length of the first lateral control arm 172 and a curve defined by the plurality of spaced apart holes 194 of the arcuate shaped elongate portion 196 of second crank member 166 has a radius equal to the length of the second lateral control arm 178. The significance of this arrangement is that each of the windrow shields 40a, 40b may be placed at any width position when the shields are open yet the shields will come to rest at the same "home" position when the shields are closed, as is depicted in FIG. 12. Thus, regardless of which of the holes 194 the lateral control arms 172, 178 are inserted, the windrow shields 40a, 40b will assume a folded position similar to that shown in FIG. 12 when the shields are closed by operation of the first actuator. In such folded position, the windrow shields are safe from potential damage that might otherwise be caused by lowering of the frame suspension element 24 of the transport arrangement 22 into the position shown in FIG. 8. Further, opening and closing of the shields is performed remotely by in-cab operation of the first actuator without need for the operator to exit the tractor and manually open and close the shields or otherwise intervene at any point during the transport wheel deployment process. Further, the system operates independently of the windrow width setting in that there is no need for additional mechanisms to stop rotation of the first and second crank members 60, 66 due to windrow shield position. It will be understood that the geometry described above applies both to the three crank arm system of the subject application illustrated in FIGS. 9-12 as well as the two crank arm system shown in FIGS. 13 and 14. That is, the concentricity of the lateral control arms and the array of holes in the home position is applicable to both systems.

The first actuator 52 or 152 may be electromechanical or pneumatic in operation. However, in an exemplary aspect it can be hydraulically coupled to the transport wheel deployment actuator 39. Thus, when converting from field to road operation, the hydraulic system will first supply fluid to the first actuator to rotate the elongate portions 96 of the first and second crank members 60, 66 in a direction approximately 90° to the chassis 12 to fold the windrow shields toward the chassis until the first actuator is substantially fully extended/retracted. At this point, fluid is applied to the transport wheel actuator 39 in order to deploy the transport wheels 28, 30 into operating/road position. When converting from road to field operation, the hydraulic system will provide fluid to the transport wheel actuator 39 causing the transport wheels to raise upwardly for field operation. When the transport wheel actuator 39 is sufficiently extended (or retracted depending on the cylinder setup), fluid is supplied to the first actuator 52 or 152 to rotate the elongate portions 96 of the first and second crank members 60, 66 to a position substantially aligned with the chassis trail frame thereby causing the windrow shields to unfold into their field position. That is, the entire operation of folding of the windrow shields 40a, 40b and deployment of the transport wheels 28, 30, as well as the reverse operation, can be accomplished by activation of a single remote in-cab hydraulic, pneumatic or electric control or can be coupled to an existing function, transport or otherwise.

Figure 15:
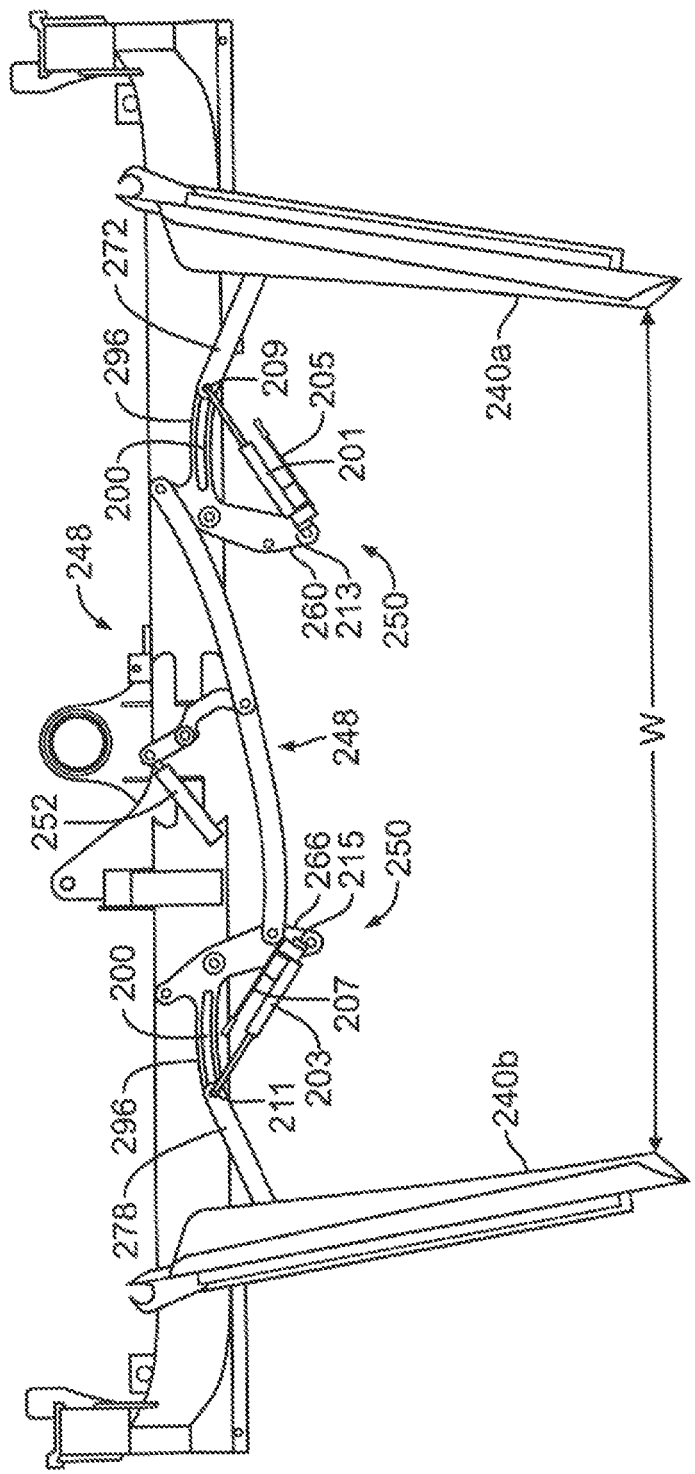
FIG. 15 is a bottom plan view of a portion of a header for an agricultural harvester according to a further aspect of the subject application with the windrow shields thereof shown in a first position.
Figure 16:
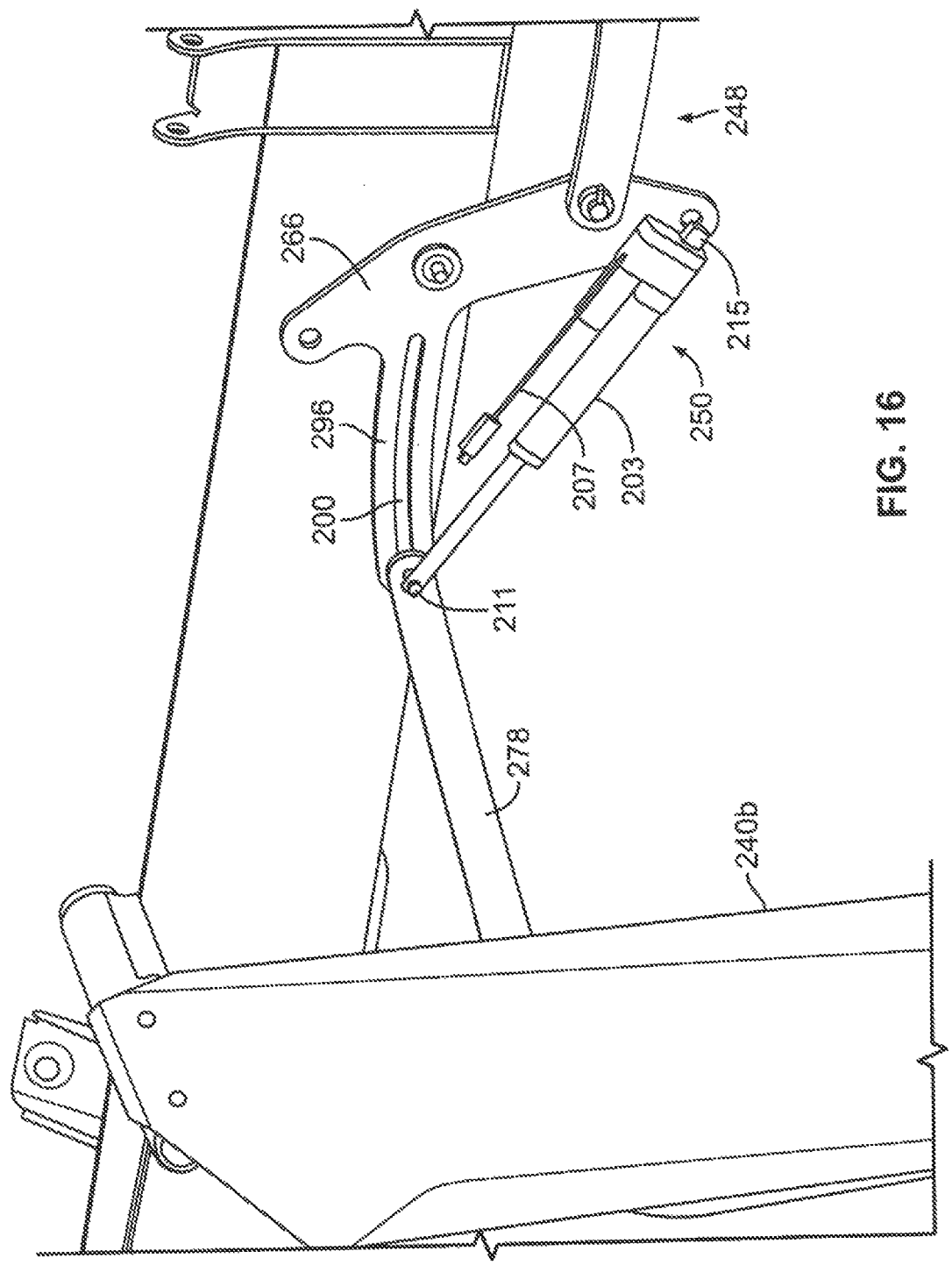
FIG. 16 is an enlarged perspective view of the windrow shield positioning mechanism of FIG. 15.

Turning to FIGS. 15 and 16, there is shown a further aspect of a windrow shield linkage assembly of the subject application identified generally by reference 248. Assembly 248 shares several features in common with windrow shield linkage assemblies 48 and 148. Accordingly, only the essential features of assembly 248 and those features thereof whose construction and/or operation materially depart from those described above, or are otherwise necessary for a proper understanding of the subject application, will be described in detail in connection with FIGS. 15 and 16. Likewise, in addition to the windrow shield linkage assembly 248, FIGS. 15 and 16 depict a windrow shield positioning adjuster 250 according to a further aspect of the subject application. As shown in FIG. 15, the windrow shield linkage assembly 248 and the windrow shield positioning adjuster 250 are disposed in a manner similar to that shown in FIG. 9. That is, a first actuator 252 of the windrow shield linkage assembly 248 is an a retracted position whereby the windrow shields 240a, 240b are open and the windrow width "W" is essentially at full swath width.

As shown in FIGS. 15 and 16, the windrow shield positioning mechanism 250 comprises arcuate shaped elongate slots 200 provided in elongate portions 296 of the first and second crank members 260, 266. That is, the elongate slots 200 define arcs within the elongate portions 296. Windrow shield positioning adjuster 250 further includes a pair of second and third extendable and retractable actuators 201, 203. The second and third actuators may be hydraulic, pneumatic or electromechanical in construction and operation. In the illustrated example, the second and third actuators 201, 203 are electromechanical and are powered by electrical wires or cables 205, 207 that are in electrical communication with the tractor's electrical system and which enable remote in-cab independent operation of the second and third actuators in the manner described below.

In particular, the first crank member 260 includes an elongate slot 200 for receiving a first end 209 of the second actuator 201 that connects the first lateral control arm 272 to the first crank member elongate slot 200 for establishing a desired open position of the first windrow shield 240a. Likewise, the second crank member 266 includes an elongate slot 200 for receiving a first end 211 of the third actuator 203 that connects the second lateral control arm 278 to the second crank member elongate slot 200 for establishing a desired open position of the second windrow shield 240b. The second and third actuators have second ends 213, 215, respectively, that are pivotably connected to the first and second crank members 260, 266, respectively. The first ends 209, 211 of the second and third actuators 201, 203 are pivotably connected to the first and second lateral control arms 272, 278 and are slidably received in slots 200, as most clearly shown in FIG. 16. Extension and retraction of the second and third actuators 201, 203 causes the inner ends of the first and second lateral control arms 272, 278 to traverse arcuate paths along the slots 200.

The second and third actuators 201, 203 are selectively and independently controllable. That is, the second actuator 201 is operatively connected to the first windrow shield 240a for moving the first windrow shield to a desired open position independently of the second windrow shield and the third actuator 203 is operatively connected to the second windrow shield 240b for moving the second windrow shield to a desired open position independently of the first windrow shield. Such selective positioning enables the windrow shields to be independently adjusted toward and way from one another to control both the windrow opening width "W" as well as the lateral positioning of such windrow opening, e.g., relative to the left or right, with respect to the centerline of the mower as may be necessary or desirable.

Figure 17:
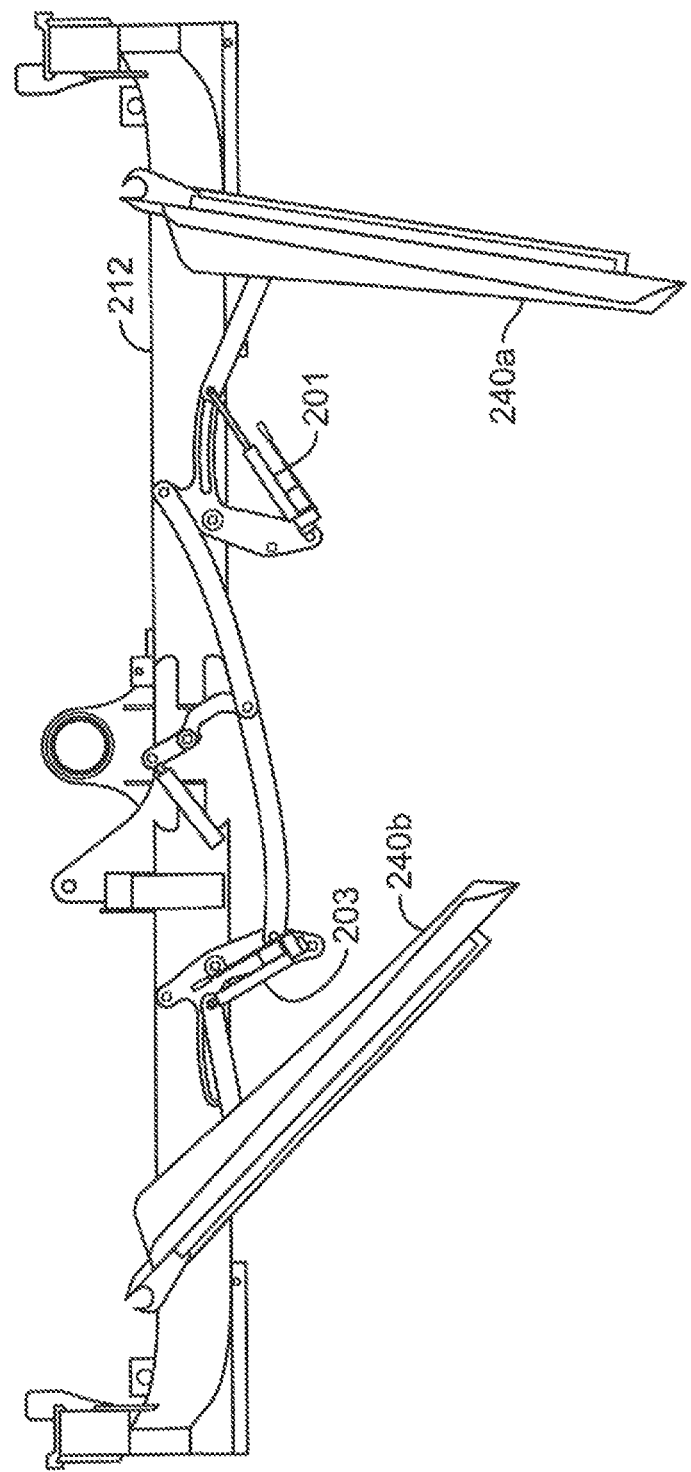
FIG. 17 is a view similar to FIG. 15 with one of the windrow shields thereof shown in a narrowed windrow forming position.

An example of such independent control of the second and third actuators 201, 203 is illustrated in FIG. 17. More specifically, first actuator 201 is shown in an extended position whereby the first windrow shield 240a assumes a wide opening position with respect to chassis 212. In contrast, second actuator 203 is shown in a retracted position whereby the second windrow shield 240b assumes a narrow opening position with respect to chassis 212. With the windrow shields 240a, 240b so positioned, not only is the width of the windrow discharged by the mower narrower in width than a full swath width but also that the windrow is shifted laterally toward windrow shield 240a. It will be appreciated that the opening width between the distal ends of the first and second windrow shields 240a, 240b as well as the degree to which the windrow shield is shifted toward either shield 240a or 240b is limited by the length of slots 200 and the degree of extension of the second and third actuators 201, 203 within those slots.

The windrow shield positioning mechanism shown in FIGS. 15-17 provides remote in-cab functionality to operate the windrow shields 240a, 240b independent of each other during field operation mode. Accordingly, the tractor operator need not dismount the tractor in order to physically adjust the windrow shields for windrow width, lateral positioning or to open and close the windrow shields for field and transport modes.

The subject application further provides a method for operating an agricultural harvester having a chassis and transport wheels and harvesting wheels attached to the chassis. According to the method, proximal ends of spaced apart windrow shields are pivotably attached to the chassis and distal ends of the windrow shields are adjustable relative to one another to define selected windrow widths and locations discharged by the harvester when the windrow shields are in an open position. The method involves closing and opening the windrow shields in concert with placement of the transport wheels into operative and inoperative positions. In general, the method includes the acts of coupling the windrow shields with a linkage assembly for movement of the windrow shields between an open position and a closed position and providing a windrow shield positioning adjuster configured to dispose the distal ends of the windrow shields into selected cut crop material opening widths. The method further comprises the act of operatively connecting a first actuator to the linkage assembly. The first actuator is operable to move the windrow shields between the open and closed positions and is configured to dispose the first and second windrow shields into the closed position independent of the selected cut crop material opening widths established by the windrow shield positioning adjuster. When it is desired to configure the harvester into transport mode, the windrow shields are moved into the closed position upon movement of the first actuator in a first direction, and the transport wheels are deployed into an operative position wherein the transport wheels are in contact with a ground surface and the harvesting wheels are spaced from the ground surface.

When it is desired to configure the harvester into field or harvesting mode, the transport wheels are deployed into an inoperative position wherein the transport wheels are spaced from the ground surface and the harvesting wheels are in contact with the ground surface. Thereafter the windrow shields are moved into the open position upon movement of the first actuator in a second direction.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:
1. A header for an agricultural harvester comprising:
   a chassis;
   first and second spaced apart windrow shields, each having a proximal end pivotably connected to the chassis and a distal end, the distal ends of the first and second spaced apart windrow shields defining an opening width for passage of cut crop material; and
   a windrow shield positioning mechanism comprising:
      a linkage assembly comprising:
         a central control arm having first and second ends,
         a first crank member pivotably connected to the chassis and the first end of the central control arm,
         a second crank member pivotably connected to the chassis and the second end of the central control arm,
         a first lateral control arm pivotably connected to both of the first crank member and the first windrow shield,
         a second lateral control arm pivotably connected to both of the second crank member and the second windrow shield;
      the linkage assembly coupling the first and second windrow shields for movement between an open position and a closed position, the linkage assembly further comprising a windrow shield positioning adjuster configured to dispose the distal ends of the windrow shields in a plurality of cut crop material opening widths; and
      a first actuator operatively connected to the linkage assembly and configured to move the windrow shields between open and closed positions independent of the cut crop material opening width.

2. The header of claim 1, wherein the first actuator is operatively connected to the central control arm.

3. The header of claim 1, further comprising a third crank member pivotably connected to the first actuator, the chassis and the central control arm, wherein movement of the third crank member in a first direction causes movement of the windrow shields toward the open position and movement of the third crank member in a second direction causes movement of the windrow shields toward the closed position.

4. The header of claim 1, wherein the first actuator is operatively connected to at least one of the first and second crank members, and wherein movement of the first and second crank members in a first direction causes movement of the windrow shields toward the open position and movement of the first and second crank members in a second direction causes movement of the windrow shields toward the closed position.

5. The header of claim 1, wherein the windrow shield positioning adjuster comprises:
   a plurality of spaced apart holes provided on an elongate portion of the first crank member for receiving a first end of the first lateral control arm and establishing a desired open position of the first windrow shield; and
   a plurality of spaced apart holes provided on an elongate portion of the second crank member for receiving a first end of the second lateral control arm and establishing a desired open position of the second windrow shield.

6. The header of claim 5, wherein the elongate portions of the first and second crank members are arcuate shaped elongate portions.

7. The header of claim 6, wherein a curve defined by the plurality of spaced apart holes of the arcuate shaped elongate portion of the first crank member has a radius equal to a length of the first lateral control arm, and wherein a curve defined by the plurality of spaced apart holes of the arcuate shaped elongate portion of the second crank member has a radius equal to a length of the second lateral control arm.

8. The header of claim 1, wherein the windrow shield positioning adjuster further comprises a second actuator operatively connected to the first windrow shield for moving the first windrow shield to a desired open position independently of the second windrow shield and a third actuator operatively connected to the second windrow shield for moving the second windrow shield to a desired open position independently of the first windrow shield.

9. The header of claim 8, wherein the first crank member includes an elongate slot for receiving a first end of the second actuator that connects the first lateral control arm to the first crank member elongate slot for establishing a desired open position of the first windrow shield, and wherein the second crank member includes an elongate slot for receiving a first end of the third actuator that connects the second lateral control arm to the second crank member elongate slot for establishing a desired open position of the second windrow shield.

10. The header of claim 9, wherein the elongate slots of the first and second crank members are arcuate shaped elongate slots.

11. The header of claim 1, wherein each of the first and second windrow shields is operable to pivot from about 0 degrees to about 90 degrees with respect to the chassis.

12. The header of claim 11, wherein each of the first and second windrow shields is operable to pivot from about 10 degrees to about 85 degrees with respect to the chassis.

13. A header for an agricultural harvester comprising:
a chassis;
first and second spaced apart windrow shields, each having a proximal end pivotably connected to the chassis and a distal end, the distal ends of the first and second spaced apart windrow shields defining an opening width for passage of cut crop material; and
a windrow shield positioning mechanism comprising:
a linkage assembly coupling the first and second windrow shields for movement between an open position and a closed position, the linkage assembly comprising:
a central control arm having first and second ends,
a first crank member pivotably connected to the chassis and the first end of the central control arm,
a second crank member pivotably connected to the chassis and the second end of the central control arm,
a first lateral control arm pivotably connected to the first crank member and pivotably connected to the first windrow shield, and
a second lateral control arm pivotably connected to the second crank member and pivotably connected to the second windrow shield;
a first actuator operatively connected to the linkage assembly and configured to move the windrow shields between open and closed positions independent of the cut crop material opening width, and
a windrow shield positioning adjuster configured to dispose the distal ends of the windrow shields in a plurality of cut crop material opening widths, the windrow shield positioning adjuster comprising:
a plurality of spaced apart holes provided on an elongate portion of the first crank member for receiving a first end of the first lateral control arm and establishing a desired open position of the first windrow shield, and
a plurality of spaced apart holes provided on an elongate portion of the second crank member for receiving a first end of the second lateral control arm and establishing a desired open position of the second windrow shield.

* * * * *